US012171704B2

(12) United States Patent
Paul

(10) Patent No.: US 12,171,704 B2
(45) **Date of Patent: *Dec. 24, 2024**

(54) PATIENT SUPPORT INCLUDING A CONNECTOR ASSEMBLY

(71) Applicant: Stryker Corporation, Kalamazoo, MI (US)

(72) Inventor: Jason Michael Paul, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 388 days.

This patent is subject to a terminal disclaimer.

(21) Appl. No.: 17/559,037

(22) Filed: Dec. 22, 2021

(65) Prior Publication Data

US 2022/0110806 A1 Apr. 14, 2022

Related U.S. Application Data

(63) Continuation of application No. 16/585,715, filed on Sep. 27, 2019, now Pat. No. 11,241,349.

(Continued)

(51) Int. Cl.

*A61G 7/057* (2006.01)
*A61G 7/00* (2006.01)
*A61G 7/05* (2006.01)

(52) U.S. Cl.

CPC ......... *A61G 7/05769* (2013.01); *A61G 7/001* (2013.01); *A61G 7/0507* (2013.01)

(58) Field of Classification Search

CPC .... A47C 27/10; A61G 7/05769; A61G 7/001; A61G 7/0507

See application file for complete search history.

(56) References Cited

U.S. PATENT DOCUMENTS 4,665,573 A 5/1987 Fiore
4,867,230 A * 9/1989 Voss ...................... A61F 7/0097 607/104

(Continued)

FOREIGN PATENT DOCUMENTS

GB 2405582 A 3/2005
WO 95007679 A2 3/1995

OTHER PUBLICATIONS

Gaymar Industries Inc., "Air Express Alternating Low Pressure Therapy Operator's Manual", Apr. 2014, 113 pages.

(Continued)

*Primary Examiner* — Adam C Ortiz

(74) *Attorney, Agent, or Firm* — Howard & Howard Attorneys PLLC

(57) ABSTRACT

This disclosure provides a patient support for supporting a patient. The patient support comprises a crib assembly comprising a support material with a cover assembly disposed over the crib assembly. The cover assembly defines a recess and comprising a patient support surface having an outer periphery. The patient support further comprises a connector assembly for connecting the patient support to a fluid source with the connector assembly comprising a connector with a plurality of ports. The assembly defines a three dimensional interior corner adjacent the recess in the cover assembly. The connector assembly is disposed in the recess of the cover assembly such that the plurality of ports of the connector are presented for connection to the fluid source at the three dimensional interior corner and inside the outer periphery of the patient support surface.

20 Claims, 14 Drawing Sheets

Related U.S. Application Data

(60) Provisional application No. 62/738,135, filed on Sep. 28, 2018.

(56) References Cited

U.S. PATENT DOCUMENTS

| | | | | |
|---|---|---|---|---|
| 4,947,500 | A | 8/1990 | Seiler | |
| 5,007,124 | A | 4/1991 | Raburn et al. | |
| 5,179,742 | A | 1/1993 | Oberle | |
| 5,617,595 | A | 4/1997 | Landi et al. | |
| 5,794,289 | A | 8/1998 | Wortman et al. | |
| 6,115,861 | A | 9/2000 | Reeder et al. | |
| 6,367,106 | B1 | 4/2002 | Gronsman | |
| 7,641,623 | B2 | 1/2010 | Biondo et al. | |
| 7,886,386 | B2 | 2/2011 | Balonick et al. | |
| 7,914,611 | B2 | 3/2011 | Vrzalik et al. | |
| 8,069,514 | B2 | 12/2011 | Poulos et al. | |
| 8,108,957 | B2 | 2/2012 | Richards et al. | |
| 8,117,701 | B2 | 2/2012 | Bobey et al. | |
| 8,118,920 | B2 | 2/2012 | Vrzalik et al. | |
| 8,372,182 | B2 | 2/2013 | Vrzalik et al. | |
| 8,490,233 | B2 | 7/2013 | Essers | |
| 8,918,930 | B2 | 12/2014 | Stroh et al. | |
| 9,254,231 | B2 | 2/2016 | Vrzalik et al. | |
| 9,314,118 | B2 | 4/2016 | Blazar et al. | |
| 9,835,344 | B2 | 12/2017 | Vrzalik et al. | |
| 10,561,556 | B2 * | 2/2020 | Rigoni | A61G 7/1028 |
| 2008/0040860 | A1 | 2/2008 | Price et al. | |
| 2009/0013470 | A1 | 1/2009 | Richards et al. | |
| 2010/0212087 | A1 | 8/2010 | Leib et al. | |
| 2011/0163885 | A1 | 7/2011 | Poulos et al. | |
| 2013/0014324 | A1 | 1/2013 | Receveur et al. | |
| 2017/0027791 | A1 | 2/2017 | McKnight et al. | |
| 2019/0091086 | A1 | 3/2019 | Emerson et al. | |
| 2020/0100966 | A1 | 4/2020 | Paul | |

OTHER PUBLICATIONS

Gaymar Industries Inc., "Air Express C1000DF Service Manual", Jul. 2007, 16 pages.
Gaymar Industries Inc., "Air Express LAL P1500 Low Air Loss Therapy System Operator's Manual", Rev. B, Apr. 2010, 32 pages.
Gaymar Industries Inc., "Aire Twin Alternating Pressure and Low-Loss Therapy Mattress Replacement Systems ATC80, ATM500, ATM800, ATW5000, ATW8000 Operator's Manual", May 2005, 8 pages.
Gaymar Industries Inc., "Auto Aire Select Dynamic Low-Air Loss Therapy Service Manual", Rev. A, Apr. 2010, 28 pages.
Gaymar Industries Inc., "Auto Aire Select Dynamic Low-Air Loss Therapy With Alternating Pressure and Active Sensor Technology Ref C2500MS Control Unit, Ref M2500S Series Mattress, Ref Auto Aire Select Safety Mattress Service Manual", Rev. B, Sep. 2010, 14 pages.
Gaymar Industries Inc., "Auto Sure-Float Ref C1000MS/C1000MES Control Unit; Ref M1001S/M1002S Series Mattress Operator's Manual", Rev. B, Sep. 2010, 128 pages.
Gaymar Industries Inc., "Clini-Dyne Lateral Rotation System CLP2000 Control Unit, CLM Series Mattress Service Manual", Rev. A, Oct. 2010, 18 pages.
Gaymar Industries Inc., "Clini-Dyne Rotational Therapy System CLP2000 Control Unit, CLM Series Mattress Operator's Manual", Rev. A, Oct. 2010, 8 pages.
Gaymar Industries Inc., "EFF302 Alternating Pad Instructions", Rev. A, Jan. 2010, 1 page.
Gaymar Industries Inc., "Instructions for Use Sof Care Mattress Series", Rev. A, May 2010, 12 pages.
Gaymar Industries Inc., "O2 Zoned Multi-Functional Portable Rotation System P4000, P4001, C4000 Series Control Unit, M4000 Series Mattress Operator's Manual", Rev. B, Oct. 2010, 12 pages.
Gaymar Industries Inc., "Paradise Pump PAR 30 Config F Alternating Pressure Pump Functional Check Instructions", Rev. A, Apr. 2007, 1 page.
Gaymar Industries Inc., "Paradise Pump Series Operator's Manual", Sep. 2005, 8 pages.
Gaymar Industries Inc., "Plexus Auto Aire Select Dynamic Low-Air Loss Therapy With Alternating Pressure and Active Sensor Technology Ref C2500MES Control Unit, Ref M2500S Series Mattress, Ref X3580S Operator's Manual", Rev. B, Sep. 2010, 42 pages.
Gaymar Industries Inc., "Plexus O2 Zoned Multi-Functional Portable Rotation System C4000 Series Control Unit, M4000 or M4001 Series Mattress Service Manual", Rev. A, Oct. 2010, 40 pages.
Gaymar Industries Inc., "Plexus Ref P102 Plexus Jr. Alternating Pressure System, Ref C102 Plexus Jr. APM Control Unit, Ref M100 Alternating Pressure Mattress Overlay Instructions for Use", Rev. C, Apr. 2012, 20 pages.
Gaymar Industries Inc., "Pressure Pedic Pressure Redistribution Mattress Instructions for Use", Rev. B, Dec. 2009, 2 pages.
Gaymar Industries Inc., "SC505 Sof Care Inflator Operating Instructions and Service Manual", Rev. C, Oct. 2010, 8 pages.
Gaymar Industries Inc., "Sof Care Bed Cushions Instructions for Use", Sep. 1993, 2 pages.
Gaymar Industries Inc., "Sof Matt Low Air Loss Mattress System Operator's Manual/Service Manual", Oct. 2010, 40 pages.
Gaymar Industries Inc., "Symmetric Aire Mattress Ref SYM3000 Series Instructions for Use", Apr. 2012, 3 pages.
Gaymar Industries, "Symmetric Aire Mattress Ref SYM3000 Series Service Document", Rev. A, Jun. 2010, 2 pages.
Plexus Medical, "O2 Zoned C4000 Portable Rotation System; CareMedx C5000 Multi-Zoned Low Air Loss Therapy System Service Manual", published at least prior to Sep. 2018, 58 pages.
Plexus Medical, "Plexus C1000D Series Control Unit Service Manual", published at least prior to Sep. 2018, 20 pages.
Plexus Medical, "Plexus P1500 Air Express LAL System Service Manual", published at least prior to Sep. 2018, 17 pages.
Sage Products, "Pressure Injury and Safe Patient Handling Solutions—Prevalon Mobile Air Transfer Systems; Prevalon Turn & Position Systems; Prevalon Heel Protectors; Prevalon Seated Positioning System Brochure", 2017, 20 pages.
Sage Products, "Prevalon Air Pump Brochure", 2017, 1 page.
Sage Products, "Prevalon AirTap Patient Repositioning System Operator's Manual", 2016, 10 pages.
Sage Products, "Prevalon AirTap XXL Patient Repositioning System Brochure", 2018, 4 pages.
Sage Products, "Prevalon Standard Turn and Position System Instructions for Use", 2016, 1 page.
Sage Products, "Prevalon Turn and Position System 2.0 Instructions for Use", 2016, 1 page.
Sage Products, "Sage Product Catalog—Pressure Injury Prevention and Safe Patient Handling", 2018, 4 pages.
Stryker Medical, "Arise 1000 EX Low Air-Loss Bariatric Surface Specification Sheet", Rev. B, 2008, 2 pages.
Stryker Medical, "Arise 1000EX Low Air Loss Therapy Mattress Model 2236 Operations/Maintenance Manual", Rev. B, May 2009, 30 pages.
Stryker Medical, "ComfortGel SE Support Surface Ref 1805 Operations Manual", Rev. C, Sep. 2016, 18 pages.
Stryker Medical, "ComfortGel Support Surface Ref 2850 Operations Manual", Rev. A, Aug. 2017, 22 pages.
Stryker Medical, "ComfortGel Support Surface Specification Sheet", Rev. E.6, Dec. 2011, 2 pages.
Stryker Medical, "EOLE / EOLE DC Pump Ref 2870, Ref 2871 Service Manual", Oct. 2017, 16 pages.
Stryker Medical, "EOLE DC Powered Support Surface Ref 2871 Operations/Maintenance Manual", Dec. 2017, 288 pages.
Stryker Medical, "EOLE Powered Support Surface Ref 2870 Operations/Maintenance Manual", Dec. 2017, 288 pages.
Stryker Medical, "IsoAir Ref 2940 Service Manual", Rev. 1.0, Nov. 2016, 144 pages.
Stryker Medical, "IsoFlex LAL Support Surface Ref 2860 Operations/Maintenance Manual", Rev. C, Aug. 2017, 28 pages.
Stryker Medical, "IsoFlex LAL Support Surface Specification Sheet", Rev. D.3, 2016, 2 pages.
Stryker Medical, "Isoflex Pressure Management Mattress Instructions for Use", Rev. A, Jun. 2010, 2 pages.

(56) References Cited

OTHER PUBLICATIONS

Stryker Medical, "IsoFlex SE Support Surface Ref 1806 Operations Manual", Rev. C, Sep. 2016, 20 pages.
Stryker Medical, "IsoGel AIR Support Surface Ref 2860 Operations Manual", Rev. F, May 2015, 25 pages.
Stryker Medical, "IsoGel Support Surface Dimensional Gel Technology Specification Sheet", Dec. 2013, 2 pages.
Stryker Medical, "Isolibrium Support Surface Ref 2971 Operations/Maintenance Manual", Rev. B, Oct. 2014, 202 pages.
Stryker Medical, "Isolibrium Support Surface Ref 2971 Operations/Maintenance Manual", Rev. C, May 2014, 200 pages.
Stryker Medical, "Isolibrium Support Surface Specification Sheet", Rev. E.4, Nov. 2013, 2 pages.
Stryker Medical, "Isolibrium Support Surface Version 4.0, Ref 2971, Ref 2972 Maintenance Manual", Rev. B, May 2017, 88 pages.
Stryker Medical, "Isolibrium Support Surface Version 4.0, Ref 2971, Ref 2972 Maintenance Manual", Rev. C.2, Jul. 2017, 88 pages.
Stryker Medical, "Mattress Assembly Page—2235-100-001—Bariatric Bed Model 2230", Rev. A, 2 pages.
Stryker Medical, "P100/Sof Care Pump Ref 2880, Ref 2890 Service Manual", Oct. 2017, 8 pages.
Stryker Medical, "Position Pro Therapy Mattress Model 2920 Operations/Mainentance Manual", Rev. A, Feb. 2007, 55 pages.
Stryker Medical, "PositionPro Patient Repositioning Support Surface-Standalone with Pendant or Integrated with FL27 In Touch CC Model Beds Ref 2920 Maintenance Manual", Rev. A, Oct. 2016, 56 pages.
Stryker Medical, "PositionPro Patient Repositioning Support Surface-Standalone with Pendant or Integrated with FL27 In Touch CC Model Beds Ref 2920 Maintenance Manual", Rev. G, Oct. 2016, 42 pages.
Stryker Medical, "Pressure Management—Dynamic Mattress System 2500 Operations/Maintenance Manual", Aug. 1994, 17 pages.
Stryker Medical, "Pressure Management—Dynamic Mattress System 2500 Operations/Maintenance Manual", Aug. 1997, 23 pages.
Stryker Medical, "ProForm Non-Powered Support Surface Model 2710 Operations/Maintenance Manual", Rev. G, Sep. 14, 2015, 134 pages.
Stryker Medical, "Save Simply Brochure", 2018, 2 pages.
Stryker Medical, "Sof Care Chair Cushion Ref 2770-209-005 Operations Manual", Rev. D, Apr. 2016, 1 page.
Stryker Medical, "Sof Care DuoGard Overlay Brochure", 2015, 3 pages.
Stryker Medical, "SofCare Healthcare Boot, Ref 2760-100-000, Ref 2760-200-000, Ref 2760-300-000 Operations Manual", Rev. C, Mar. 2016, 2 pages.
Stryker Medical, "SofCare HeelCare Boot Series Specification Sheet", Rev. B.3, Aug. 2011, 2 pages.
Stryker Medical, SofCare Stretcher Overlay Ref 2780-400-000, Ref 2780-500-000 Operations Manual, Rev. B, Dec. 2014, 2 pages.
Stryker Medical, "Spr Plus Low Air Loss Overlay 3-Layer Technology Specification Sheet", Rev. D.2, Aug. 2011, 2 pages.
Stryker Medical, "Spr Plus Overlay Ref 2790-100-000 Operations Manual", Rev. B, Dec. 2014, 2 pages.
Stryker Medical, "Stryker Air I, Stryker Air II Low Air Loss Therapy Mattress (LAL), Model 2236 Operations/Maintenance Manual", Rev. B, May 2009, 30 pages.
Stryker Medical, "Stryker Air Pump Ref 2861 Service Manual", Rev. 2.0, Jun. 2016, 58 pages.
Stryker Medical, "Ultra Comfort SE Support Surface Ref. 1703; Ref. 1704 Operations Manual", Rev. D, May 2017, 40 pages.
Stryker Medical, "XPRT Pulmonary Therapy & Wound Care Mattress Model 2950 Operations/Maintenance Manual", Rev. C, Aug. 2007, 114 pages.
Stryker Medical, "XPRT Therapeutic Support Surface Ref 2950 Operations/Maintenance Manual", Rev. B, Jun. 2012, 468 pages.
Stryker Medical, XPRT Therapy Mattress Model 2950 Operations Manual, Rev. A, Jul. 2006, 98 pages.
Stryker Medical, "XPRT Therapy Mattress Model 2950 Operations/Maintenance Manual", Rev. A, May 2006, 98 pages.
Stryker Medical, "XPRT Therapy Mattress Model 2950 Operations/Maintenance Manual", Rev. H, Jun. 2006, 98 pages.
Stryker Medical, "DuoGard Overlay Ref 2780-300-001 Operations Manual", Rev. B, Dec. 2014, 1 page.

* cited by examiner

PATIENT SUPPORT INCLUDING A CONNECTOR ASSEMBLY

CROSS-REFERENCE TO RELATED APPLICATIONS

The subject patent application is a Continuation of U.S. patent application Ser. No. 16/585,715, filed on Sep. 27, 2019, which claims priority to and all the benefits of U.S. Provisional Patent Application No. 62/738,135, filed on Sep. 28, 2018, the disclosures of each of which are hereby incorporated by reference in their entirety.

BACKGROUND

Prolonged bed rest without adequate mobilization is often associated with increased risk of pressure sores/ulcers for patients. Many patient supports (e.g., mattresses) designed to minimize sores/ulcers on a patient's body include a low air loss system and/or turn assist device. Both low air low systems and turn assist devices require a fluid source to be coupled to the patient support via tubing. Ideally, the tubing should not interfere with the operation of the bed or the patient care being provided by the caregiver. However, many patient supports couple tubing directly through a peripheral wall of the patient support and thus the tubing is prone to shifting during movement of the patient support and may interfere with caregivers.

A patient support designed to address one or more of the aforementioned deficiencies is desired.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
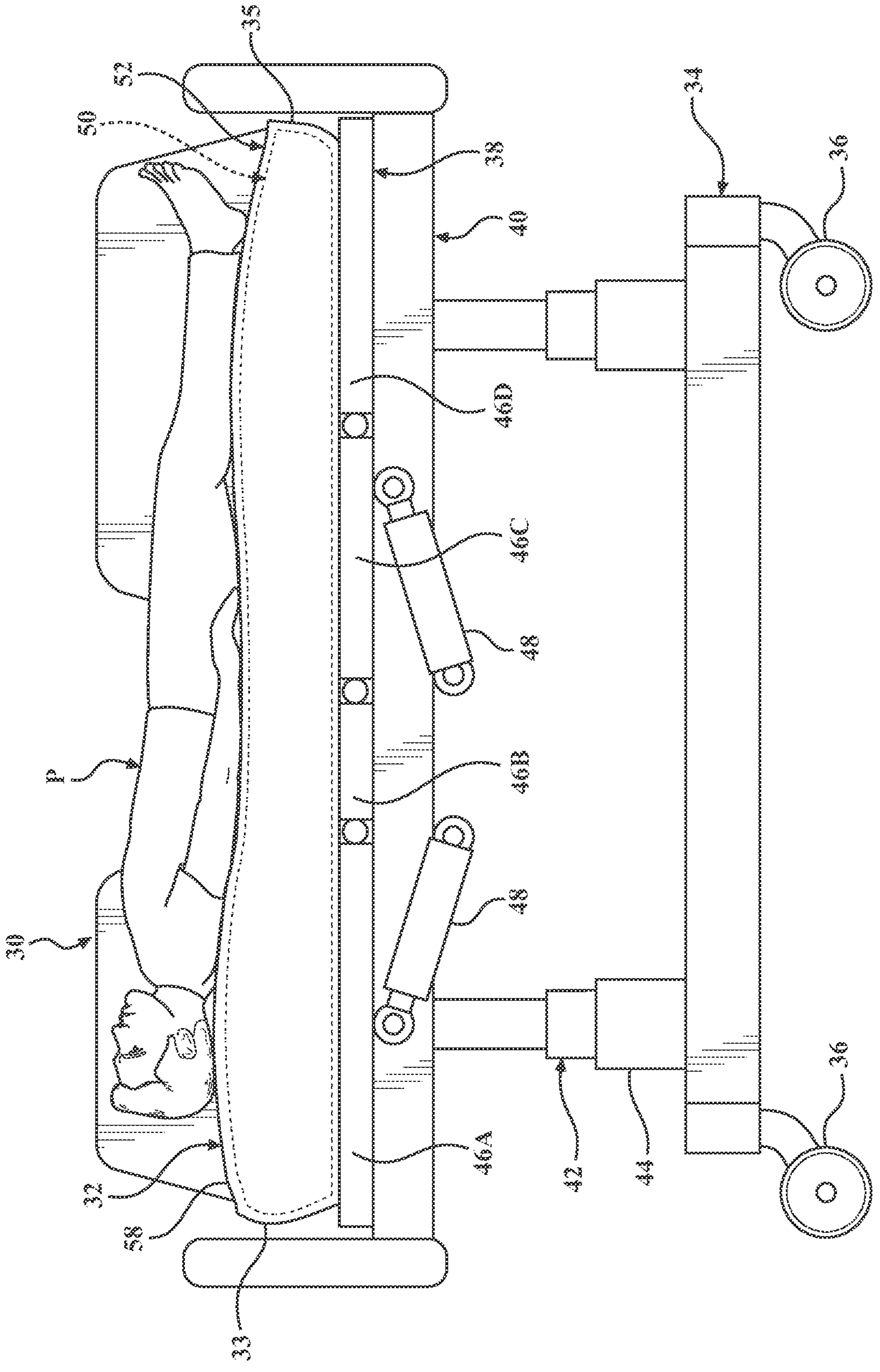
FIG. 1 is an elevational view of a patient support apparatus including a patient support.

FIG. 1 illustrates a patient support apparatus 30 including a patient support 32 in accordance with an exemplary embodiment of the present disclosure. The patient support apparatus 30 shown in FIG. 1 is a hospital bed, but alternatively may be a stretcher, cot, trolley, gurney, wheelchair, recliner, chair, table, or other suitable support or transport apparatus. The patient support apparatus 30 may include a base 34 having wheels 36 adapted to rest upon a floor surface, and a patient support deck 38 supported by the base 34. The illustrated embodiment shows the wheels 36 as casters configured to rotate and swivel relative to the base 34 during transport with each of the wheels 36 disposed at or near an end of the base 34. In some embodiments, the wheels 36 may be non-steerable, steerable, non-powered, powered, or combinations thereof. For example, the patient support apparatus 30 may comprise four non-powered, non-steerable wheels, along with one or more additional powered wheels. The present disclosure also contemplates that the patient support apparatus 30 may not include wheels.

The patient support apparatus 30 may include an intermediate frame 40 spaced above the base 34 with the patient support deck 38 coupled to or disposed on the intermediate frame 40. A lift device 42 may be operably coupled to the intermediate frame 40 and the base 34 for moving the patient support deck 38 relative to the base 34. In the exemplary embodiment illustrated in FIG. 1, the lift device 42 includes a pair of linear actuators 44, but other suitable constructions are contemplated. The illustrated embodiment also shows the patient support deck 38 including articulating sections 46 configured to articulate the patient support 32 between various configurations. The articulating sections 46 may include a fowler section 46A, a seat section 46B, a thigh section 46C, a leg section 46D, and the like, operably coupled to actuators 48. For example, the actuators 48 may move the fowler section 46A between a first position in which the patient P is supine, as illustrated in FIG. 1, and a second position in which the torso of the patient P is positioned at an incline. For another example, a gatch maneuver may be performed in which the positions of the thigh and/or leg sections 46C, 46D are articulated to impart flexion or extension to lower extremities of the patient.

The patient support 32 is supported on the patient support deck 38 of the patient support apparatus 30. The illustrated embodiment shows the patient support 32 as a mattress for supporting the patient P when positioned on the patient support apparatus 30. The patient support 32 includes a crib assembly 50 to be described in detail, and a cover assembly 52 disposed over the crib assembly 50. In other words, the crib assembly 50 is disposed within the cover assembly 52.

Figure 2:
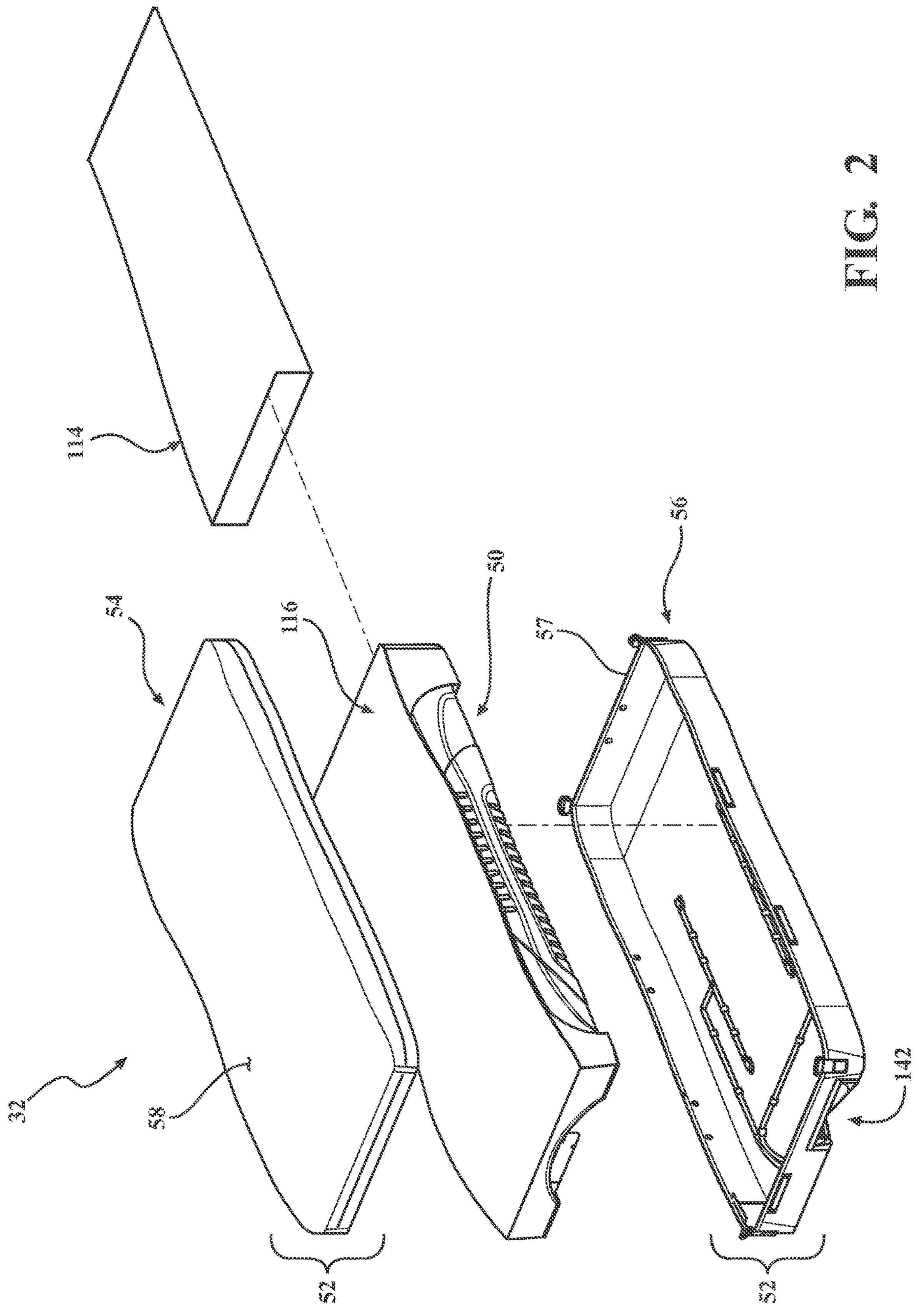
FIG. 2 is an exploded view illustrating a crib assembly, spacer layer, and a cover assembly.

Referring to FIG. 2, the cover assembly 52 may include a top cover 54 opposite a bottom cover assembly 56 that cooperate to define an interior sized to receive the crib assembly 50. In certain embodiments, the cover assembly 52 may include a fastening device 57 (see also FIG. 6) for coupling the top cover 54 and the bottom cover assembly 56. In one example, the fastening device 57 is a zipper extending about sides of the cover assembly 52. Other fastening devices may include snaps, clips, tethers, hook and eye connections, adhesive, and the like. In one variant, the top cover 54 and the bottom cover assembly 56 are integrally formed to provide the cover assembly 52 of unitary structure that is not removable from the crib assembly 50. A watershed (not shown) may be coupled to the top cover 54 and/or the bottom cover assembly 56 near the fastening device 57 to prevent ingress of fluid and other substances through the fastening device 57 to within the patient support 32. The crib assembly 50 disposed within the cover assembly 52 may be substantially encased within the cover assembly 52 to define the patient support 32. The crib assembly 50 includes a head end 33 opposite a foot end 35 separated by opposing sides 37, 39 (see FIG. 3).

The patient support 32 defines a patient support surface 58 (FIG. 2) having an outer periphery (OP) for supporting the patient P. Absent bedding and the like, the patient P may be considered in direct contact with the patient support surface 58 when situated on the patient support 32. Referring now to FIGS. 1 and 2, the patient support surface 58 may be considered an upper surface of the top cover 54 of the cover assembly 52. The patient support surface 58 is sized to support at least a majority of the patient P. Furthermore, during movement therapy to be described, the patient support surface 58 is moved relative to other structures of the patient support 32 and the patient support apparatus 30.

Certain aspects of the crib assembly 50 will now be described with reference to FIGS. 4 and 5. The crib assembly 50, in a most general sense, provides the internal structure of the patient support 32 for supporting and cushioning the patient P on the patient support surface 58. The crib assembly 50 includes a support material. The support material includes at least one, and in the illustrated embodiment more than one, conformable layers to resiliently deform when supporting the weight of the patient P. FIG. 5 shows the crib assembly 50 including an upper conformable layer 60 and a lower conformable layer 62. The upper conformable layer 60 may include a first section 64, a second section 65, and a third section 66 positioned along a length of the crib assembly 50 from the head end 33 to the foot end 35. In other words, the length of the crib assembly 50 extends along a longitudinal axis from the head end 33 to the foot end 35. The crib assembly 50 also includes a lateral axis extending along the width of the crib assembly 50. The first, second, and third sections 64-66 may be arranged (e.g., positioned adjacent to one another) such that the upper conformable layer 60 is disposed beneath at least a majority of the patient support surface 58. In other words, the first section 64 may be disposed near the head end 33 and configured to support at least a portion of the upper body of the patient P, the third section 66 may be disposed near the foot end 35 and positioned to support at least a portion of the lower body of the patient P, and the second section 65 may be disposed between the first and third sections 64, 66 and positioned to support at least a portion of the upper and/or lower body of the patient P. More specifically, the second section 65 may be positioned to support the sacrum, buttocks, and thighs of the patient P, and includes features to be described that accommodate the increased focal pressures often experienced by the patient P in these anatomical areas.

In certain embodiments, the first, second, and/or third sections 64-66 of the upper conformable layer 60 may each include a lattice 68 of cells 70 to be described in greater detail. The lattices 68 of cells 70 may be integrally formed or separately formed lattices 68 that are connected together. Each lattice 68 of cells 70 may be formed of elastic materials, visco-elastic materials, and/or other suitable materials. FIG. 5 shows the first, second, and third sections 64-66 including a head lattice, a torso lattice, and a foot lattice, respectively, with the lattices 68 of an adjacent two of the first, second, and third sections 64-66 positioned in an interlocking arrangement (e.g., a hexagonal tessellation to be described). In other words, the cells 70 at one end of the head lattice 68 are staggered to provide a zig-zag end, and the cells 70 at a complementary end of the torso lattice 68 are staggered to provide a complementary zig-zag end. Likewise, the cells 70 at the other end of the torso lattice 68 are staggered to provide a zig-zag end, and the cells 70 at a complementary end of the foot lattice 68 are staggered to provide a complementary zig-zag end. The complementary zig-zags are positioned in abutting relationship to provide the interlocking arrangement such that, when assembled, the lattices 68 of the first, second, and third sections 64-66 appear integrally formed or continuous.

Figure 4:
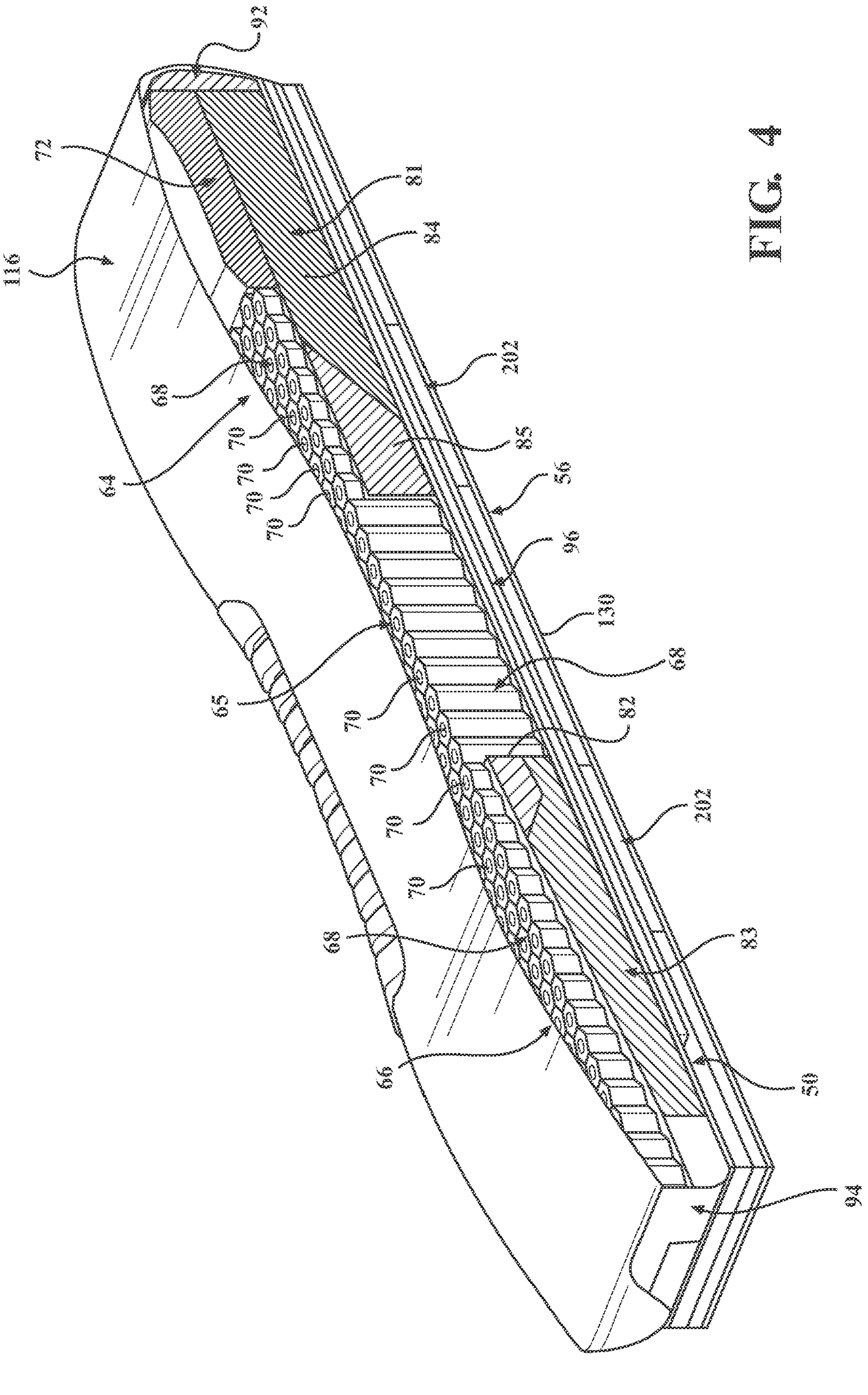
FIG. 4 is a cross-sectional view of the crib assembly and the spacer layer.
Figure 5:
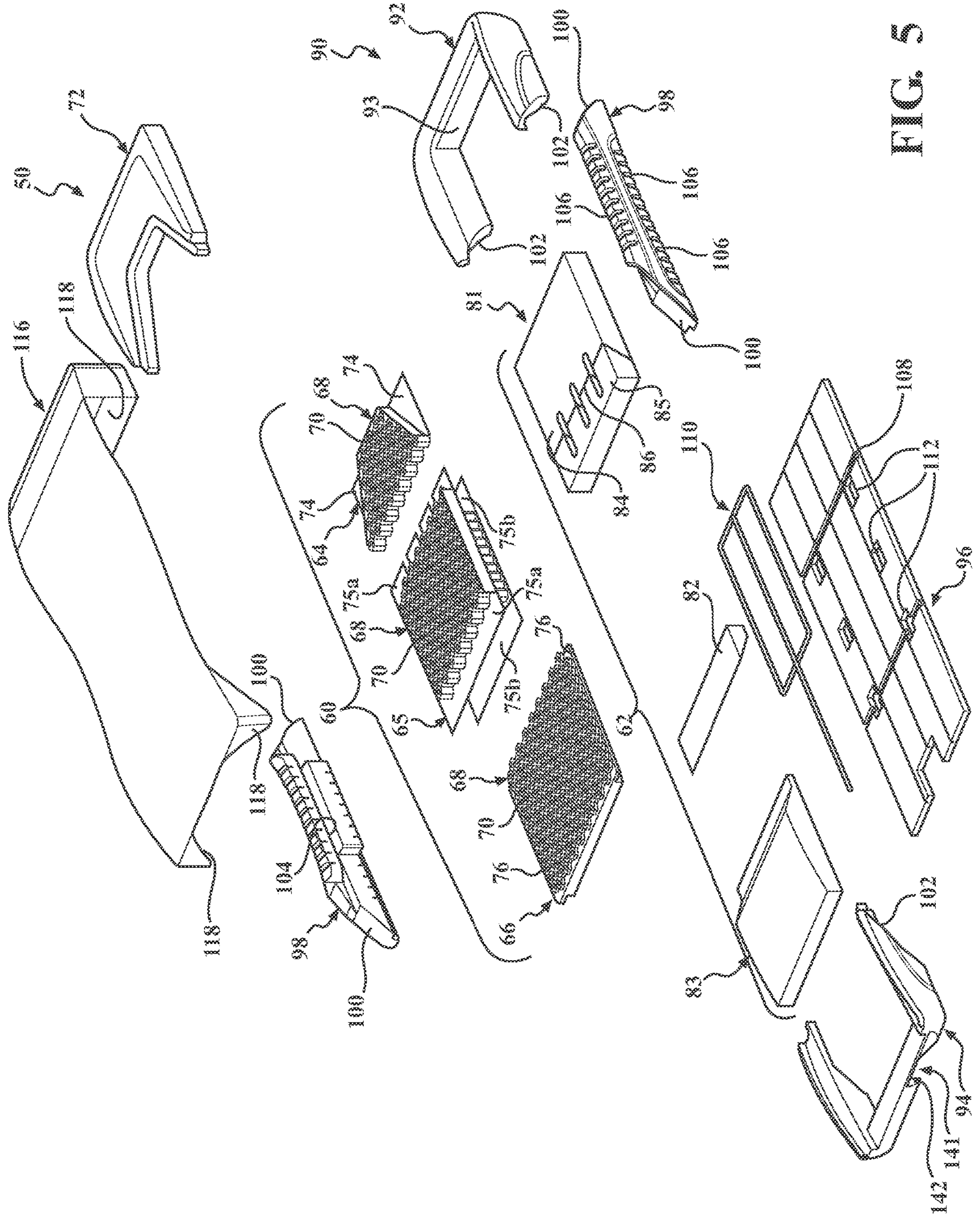
FIG. 5 is an exploded view of the crib assembly and the spacer layer.

With continued reference to FIGS. 4 and 5, the lattice 68 of the first section 64 may include a taper such that the lattice 68 appears generally trapezoidal in shape when viewed in plan. The taper is shaped to accommodate a head end support 72 of the crib assembly 50. In particular, the head end support 72 may be generally U-shaped in construction with opposing legs of the head end support 72 being shaped complementarily to the taper of the lattice 68 of the first section 64. The first section 64 may include coupling features 74 (described further below) extending outwardly from the legs of the trapezoidal-shaped lattice 68 such that the first section 64 appears rectangular when viewed in plan. The coupling features 74 are configured to be coupled with an underside of the legs of the head end support 72 by a suitable joining means, for example an adhesive. A thickness of an end of the head end support 72 adjacent the first section 64 may be approximate a thickness of the lattice 68 of the first section 64 such that, when the head end support 72 and the first section 64 are coupled together, a contoured surface is provided. It is understood from FIGS. 4 and 5 that the head end support 72 may be further contoured in a manner to support the head of the patient P. In certain embodiments, the head end support 72 may be formed from material(s) with less conformability relative to that of the lattice 68 of the first section 64 to accommodate the distinct considerations of supporting the head of the patient P on the patient support 32.

The second section 65 of the upper conformable layer 60 may include the lattice 68 that is generally rectangular in shape when viewed in plan. The second section 65 may include coupling features 75*a*, 75*b* extending outwardly from the rectangular-shaped lattice 68. The coupling features include upper coupling features 75*a*, and lower coupling features 75*b* to be described. The upper coupling features 75*a* on one end of the second section 65 are configured to be coupled with an underside of the first section 64 by a suitable joining means, for example an adhesive, when the head lattice and the torso lattice are positioned in the interlocking arrangement previously described. Likewise, upper coupling features 75*a* on the other end of the second section 65 are configured to be coupled with an underside of the third section 66 with a suitable joining means, for example an adhesive, when the torso lattice and the foot lattice are positioned in the interlocking arrangement previously described. As best shown in FIG. 4, a thickness of the lattice 68 of the second section 65 may be greater than each of the lattices 68 of the first and third sections 64, 66. The increased thickness of the torso lattice, among other advantages, accommodates the increased focal pressures often experienced by the patient P in the anatomical areas mentioned.

The lower conformable layer 62 may include a first section 81, a second section 82, and a third section 83. The first, second, and/or third sections 81-83 of the lower conformable layer 62 may be formed from foam-based material(s) and/or other suitable material(s). The material(s) comprising the first, second, and/or third sections 81-83 may be less conformable relative to that of the lattices 68 of the first, second, and/or third sections 64-66, as it is appreciated that cushioning demands of the lower conformable layer 62 may be relatively less than that of the upper conformable layer 60. The first section 81 may be at least partially positioned beneath at least one of the head end support 72 and the first section 64 of the upper conformable layer 60. In other words, an underside of the head end support 72 and/or the first section 64 is supported upon an upper surface of the first section 81. The first section 81 may include a first portion 84 and a second portion 85 coupled to one another at a joint 86.

As mentioned, the thickness of the lattice 68 of the second section 65 may be greater than the thickness of each of the lattices 68 of the first and third sections 64, 66. With continued reference to FIGS. 4 and 5, an end of the first section 81 of the lower conformable layer 62 may be positioned adjacent a corresponding end of the second section 65 of the upper conformable layer 60. In certain locations of the second section 65, there may not be a structure of the lower conformable layer 62 positioned beneath the second section 65 of the upper conformable layer 60. The second section 82 of the lower conformable layer 62 is positioned adjacent another end of the second section 65 of the upper conformable layer 60 opposite the first section 81, as best shown in FIG. 4. The second section 82 of the lower conformable layer 62 may further be at least partially positioned beneath the third section 66 of the upper conformable layer 60. In other words, an underside of the third section 66 is supported on an upper surface of the second section 82.

The third section 83 of the lower conformable layer 62 may be positioned adjacent the second section 82. The third section 83 may be at least partially positioned beneath at least one of the second and third sections 65, 66 of the upper conformable layer 62. In other words, an underside of the second section 65 and/or the third section 66 of the upper conformable layer 62 is supported upon an upper surface of the third section 83 of the lower conformable layer 62. With continued reference to FIGS. 4 and 5, each of the second and third sections 82, 83 of the lower conformable layer 62 may include complementarily inclined surfaces positioned in an abutting relationship.

As mentioned, the coupling features of the second section 65 may include the upper coupling features 75*a* previously described, and lower coupling features 75*b*. The lower coupling features 75*b* extend outwardly from the rectangular-shaped lattice 68 and are spaced apart from the upper coupling features 75*a* to define gaps therebetween. The lower coupling features 75*b* on one end of the second section 65 are configured to be coupled with an underside of the first section 81 by a suitable joining means, for example an adhesive, and the lower coupling features 75*b* on the other end of the second section 65 are configured to be coupled with an underside of the third section 83 by a suitable joining means, for example an adhesive. In such an arrangement, the gaps between the upper and lower coupling features 75*a*, 75*b* are sized to receive a thickness of the first section 81 and a combined thickness of the second and third sections 82, 83, as best shown in FIG. 4.

The upper conformable layer 60 and the lower conformable layer 62 are configured to be received in a cavity defined by a crib 90 of the crib assembly 50. In a most general sense, the crib 90 provides a framework of the patient support 32. In the illustrated embodiment, the crib 90 may include a head end frame member 92, a foot end frame member 94, a base layer 96, and side frame members 98 with each to be described in turn. The head end frame member 92 may be generally U-shaped in construction with the head end frame member 92 engaging the first section 81 of the lower conformable layer 62 on three sides. The head end frame member 92 may include a recess 93 sized to receive an end of the first section 81. Further, the generally U-shaped head end frame member 92 may at least partially engage the head end support 72 on three sides. In at least some respects, the head end frame member 92 may be considered the head end 33 of the crib assembly 50.

The foot end frame member 94 may be coupled to the upper and lower conformable layers 60, 62 opposite the head end frame member 92. The foot end frame member 94 may be coupled to an end of the third section 66 opposite the second section 65. FIG. 5 shows the foot end frame member 94 being generally U-shaped in construction so that the foot end frame member 94 engages the third section 66 on three sides. In particular, the third section 66 of the upper conformable layer 60 includes coupling features 76 extending from opposing sides of the lattice 68. The coupling features 76 are configured to be coupled with an upper surface of opposing legs of the generally U-shaped foot end frame member 94 by a suitable joining means, for example an adhesive. In at least some respects, the foot end frame member 94 may be considered the foot end 35 of the patient support 32.

Flanking the upper and lower conformable layers 60, 62 are the side frame members 98. The side frame members 98 are coupled to each of the head end frame member 92 and the foot end frame member 94. With concurrent reference to FIG. 3, the illustrated embodiment shows the side frame members 98 including inclined surfaces 100 matingly engaging complementary inclined surfaces 102 of each of the head end frame member 92 and the foot end frame member 94. Further, the side frame members 98 may be coupled to one or both of the upper and lower conformable layers 60, 62. FIG. 5 shows the side frame members 98 including an upper ledge 104 configured to receive the upper coupling features 75*a* extending from opposing sides of the second section 65 with a suitable joining means, for example an adhesive.

Referring to FIG. 5, the side frame members 98 may include slots 106 at least partially extending transversely through the side frame members 98 to define rib-like structures. The slots 106 may be provide for flexion of the side frame members 98 through relative articulation of the rib-like structures secondary to the material forming the side frame members 98. The slots 106 may further include upper and lower slots extending inwardly from upper and lower surfaces, respectively, of the side frame members 98.

The side frame members 98 coupled to each of the head end frame member 92 and the foot end frame member 94 may be considered to define a perimeter of the crib 90. The aforementioned cavity within which the upper and lower conformable layers 60, 62 are received is further defined by the base layer 96. Referring again to FIG. 5, the base layer

96 may be a planar structure to which each of the head end frame member 92, the foot end frame member 94, and the side frame members 98 are coupled. The base layer 96 is positioned beneath the lower conformable layer 62 such that an upper surface the base layer 96 may support the lower conformable layer 62. The base layer 96 may include at least one channel 108 sized to receive a first conduit assembly 110. The first conduit assembly 110 is configured to be in communication with a fluid source (not shown) to at least partially define a fluid flow path and circulate fluid from the fluid source, for example, air or conditioned fluid, through the fluid flow path to supply heat, remove heat, supply moisture, remove moisture, or the like, from the patient support surface 58. In other words, the first conduit assembly 110 circulating fluid may be utilized to control the conditions at or near an interface between the top cover 54 and the skin of the patient, to control the temperature and/or humidity at the interface. The base layer 96 may also define apertures 112 to accommodate structures of a patient turning system 200 to be described in greater detail. In certain embodiments, the crib assembly 50 includes a fire barrier layer 114 (see FIG. 2). Exemplary fire barrier layers suitable for the present application may be provided under the tradename NoMex (DuPont Company, Wilmington, Dela.), and under the tradename Integrity30 (Ventrex Inc., Ashburn, Virg.).

The patient support 32 may include a spacer layer 116 covering substantially an entirety of an upper surface of the crib assembly 50. More particularly, the spacer layer 116 covers the head end support 72 and the upper conformable layer 60. As best shown in FIG. 5, the spacer layer 116 may include coupling features 118 with the coupling features 118 at one end sized to receive the crib assembly 50, and more particularly the head end frame member 92. The coupling features 118 at the opposing end are configured to be coupled to the foot end frame member 94. The coupling features may be gusset-like features, such as elastic gussets conventionally provided on fitted sheets.

As previously mentioned, the top cover 54 is coupled to the bottom cover assembly 56, for example, with the fastening device 57. Components and features of the bottom cover assembly 56 will now be described with reference to FIG. 6. The bottom cover assembly 56 includes a carrier sheet 120. An upper surface of the carrier sheet 120 may be considered the structure in direct contact with an underside of the base layer 96 when the patient support 32 is assembled. At least one coupler 122 may be coupled to and extend from the upper surface of the carrier sheet 120. The couplers 122 are configured to secure a second conduit assembly 124 of the patient turning system 200 to be described. An underside of the base layer 96 may include additional channels (not shown) sized to receive the second conduit assembly 124 such that the underside of the base layer 96 and the upper surface of the carrier sheet 120 are in direct flat-on-flat contact. The carrier sheet 120 may include a base portion 126 and opposing sides 128 extending upwardly from the base portion 126. The fastening device 57 may be coupled to an upper edge of the opposing sides 128.

A bottom cover 130 may be coupled to the carrier sheet 120 to define a bottom of the patient support 32. In other words, an underside of the bottom cover 130 may be considered the surface in direct contact with the patient support deck 38 of the patient support apparatus 30 (see FIG. 1). The bottom cover 130 may include a head end section 132, a middle section 134, and a foot end section 136. The head end section 132, the middle section 134, and the foot end section 136 may be integrally formed or discrete components coupled to one another. The head end, middle, and foot end sections 132-136 collectively define a cavity sized to receive the carrier sheet 120, at least one patient turning device 202 of the patient turning system 200 to be described, and at least a portion of the crib assembly 50 previously described. In particular, an upstanding sidewall of each of the head end section 132 and the foot end section 136 may be arcuate and contoured to the head end frame member 92 and the foot end frame member 94, respectively, of the crib assembly 50. In the illustrated embodiment of FIG. 6, one or more handles 138 are coupled to head end, middle, and/or foot end sections 132-136 to assist caregivers with manipulating the patient support 32 when the patient support 32 is disposed on the patient support deck 38.

Figure 6:
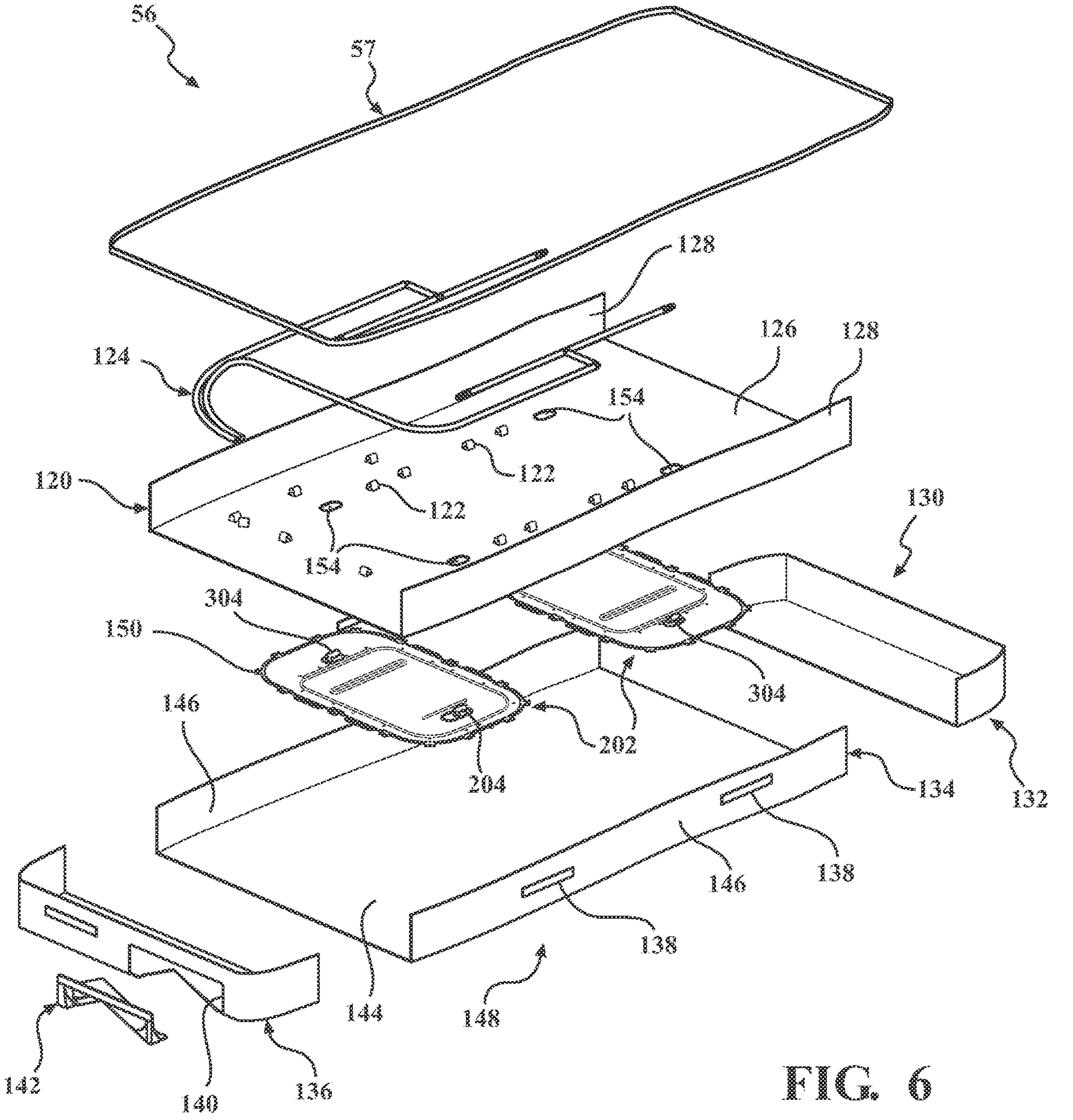
FIG. 6 is an exploded view of a bottom cover assembly.
Figure 12:
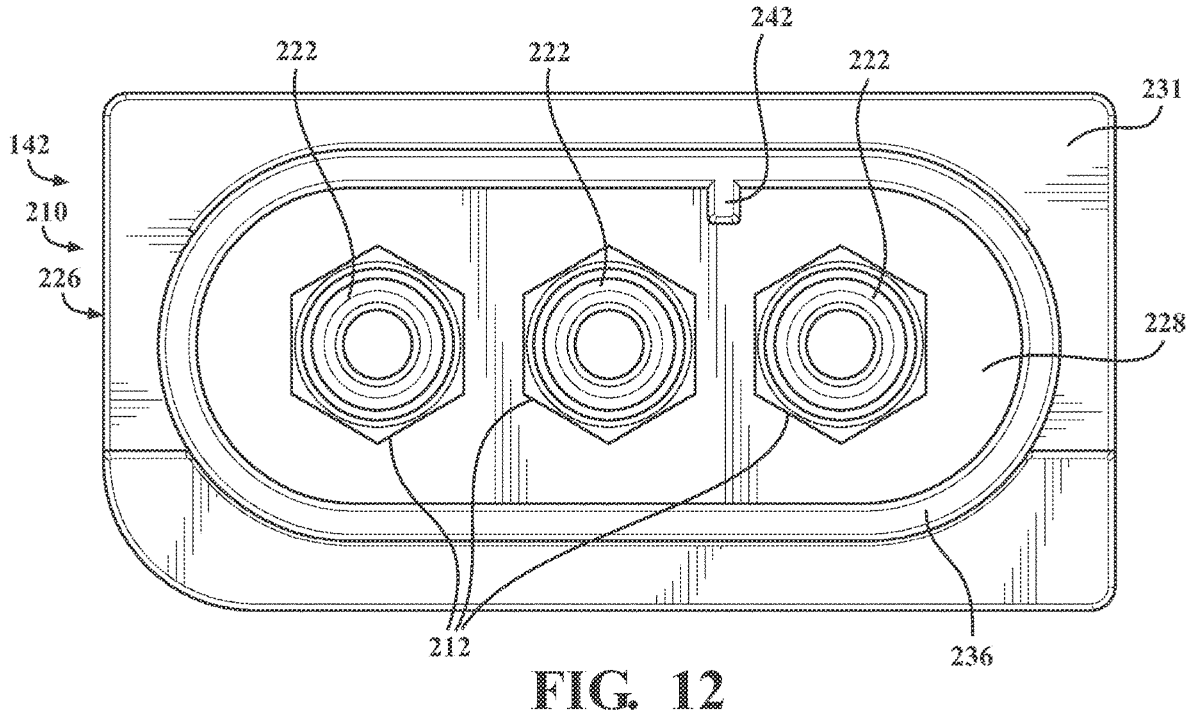
FIG. 12 is front view of a connector assembly.
Figure 13:
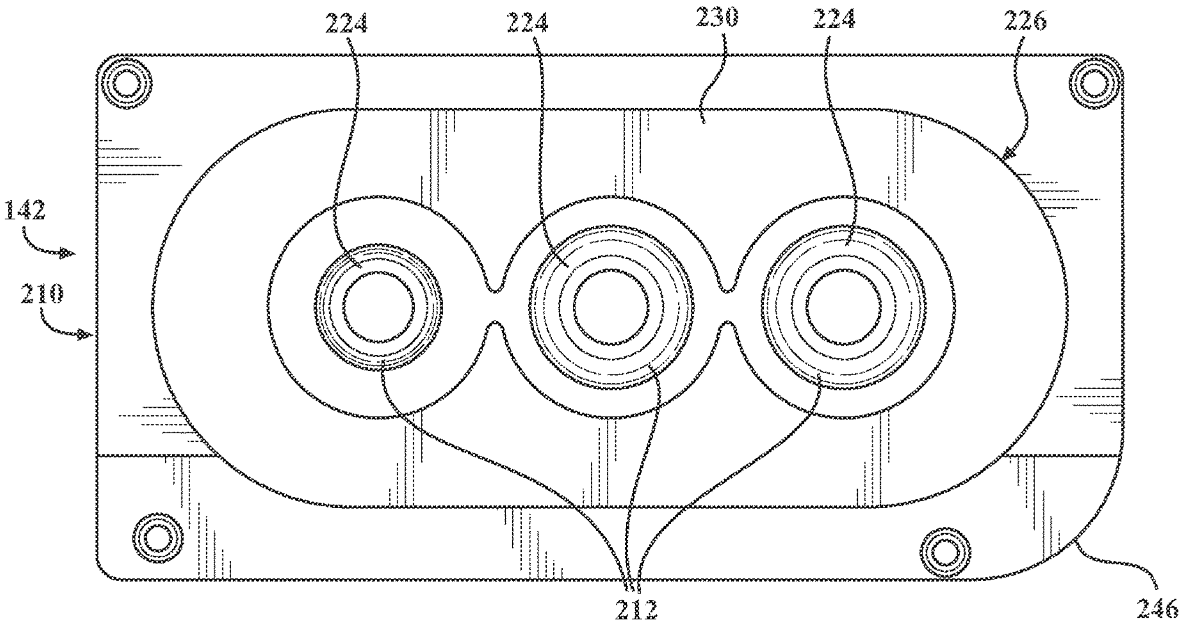
FIG. 13 is a rear view of the connector assembly.
Figure 14:
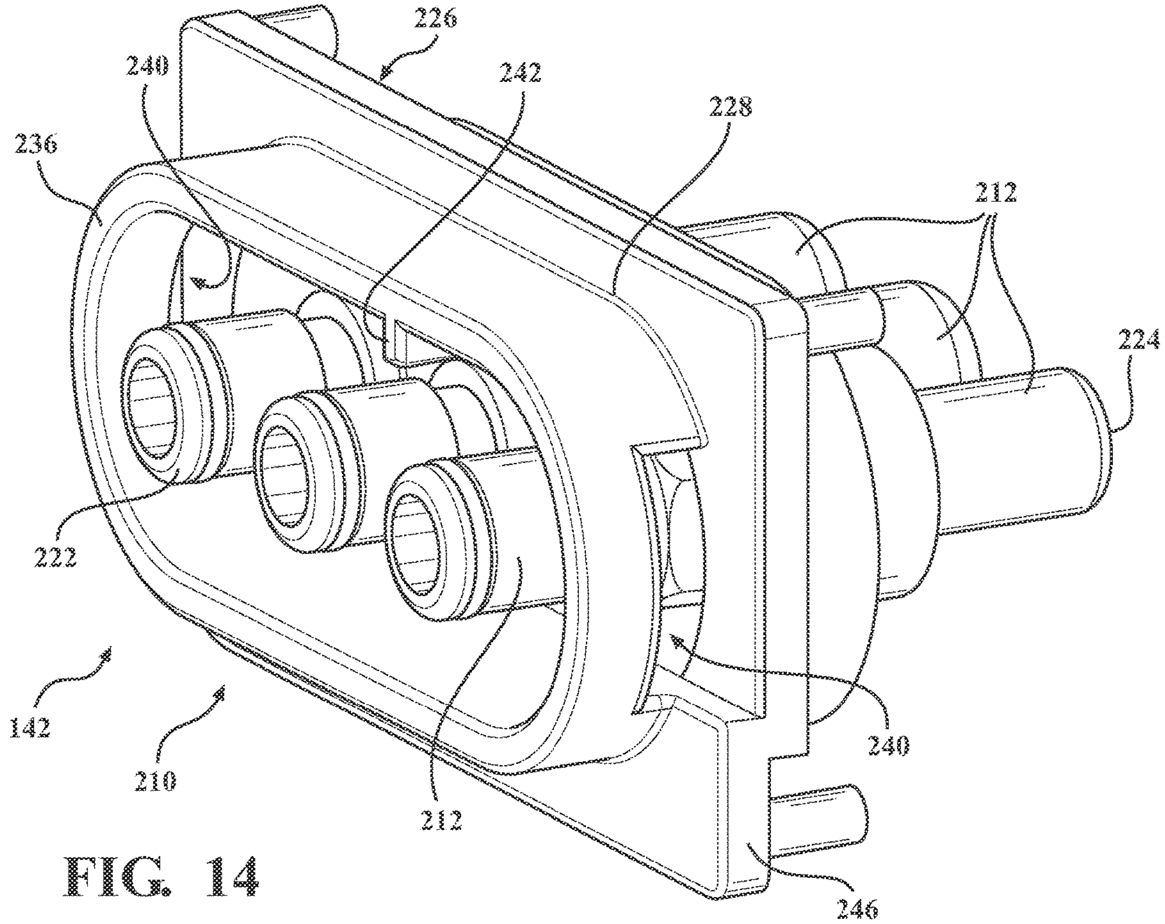
FIG. 14 is a perspective view of the connector assembly.
Figure 15:
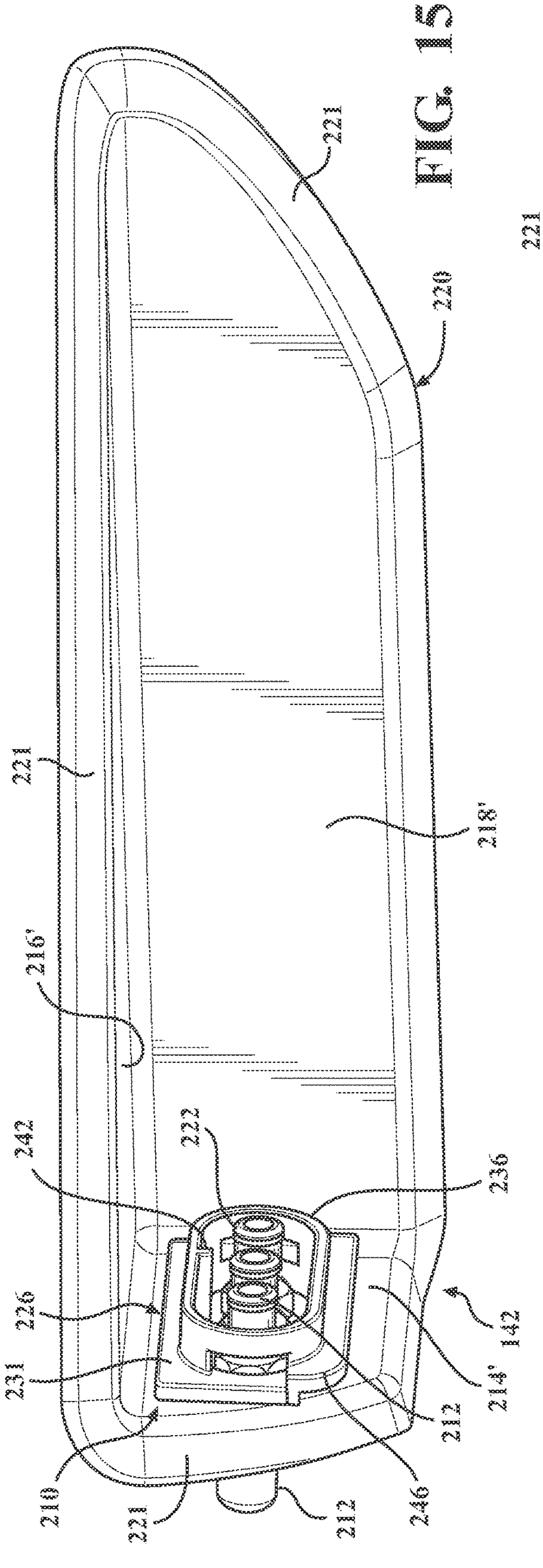
FIG. 15 is a perspective view of the connector assembly including the carrier.

The cover assembly 52 defines a recess 140 sized to receive a connector assembly 142. As best shown in FIGS. 12-14, the connector assembly 142 includes a connector 210 and a plurality of ports 212. Although the recess 140 may be defined at any portion of the cover assembly 52, the recess 140 is typically defined in the foot end section 136, such as shown in FIG. 6. Adjacent to the recess 140 of the cover assembly 52, the crib assembly 50 defines a three dimensional interior corner 141. For example, when recess 140 of the cover assembly 52 is defined in the foot end section 136, the three dimensional interior corner 141 is defined in foot end frame member 94 (see FIG. 5). The connector assembly 142 is disposed in the recess 140 of the cover assembly 52 such that the plurality of ports 212 of the connector 210 are presented for connection to the fluid source at the three dimensional interior corner 141 and inside the outer periphery of the patient support surface 58, as described further below.

The middle section 134 of the bottom cover 130 includes a base portion 144 and opposing sides 146 extending upwardly from the base portion 144. The fastening device 57 may be coupled to an upper edge of the opposing sides 146 (with or without also being coupled to the upper edge of the opposing sides 128 of the carrier sheet 120). With the carrier sheet 120 received within the middle section 134 of the bottom cover 130, the base portion 126 of the carrier sheet 120 is adjacent the base portion 144 of the bottom cover 130 (other than the presence of the patient turning devices 202), and the opposing sides 128 of the carrier sheet 120 are adjacent the opposing sides 146 of the bottom cover 130. The base portion 144 and/or opposing sides 146 of the bottom cover 130 may define an augmenting feature 148. In short, because the patient turning devices 202 are positioned external to the crib assembly 50 yet within the bottom cover assembly 56, the augmenting features 148 accommodate the expansion of the patient turning devices 202 and prevent "hammocking" of the patient support surface 58 during the movement therapy (i.e., localized alteration or stretching of the patient support surface 58 to a generally concave or arcuate contour that results in localized pressure points). For example, the augmenting features 148 may include the opposing sides 146 of the bottom cover 130 to be at least partially formed from Neoprene and/or other suitably elastic material(s).

With continued reference to FIG. 6 and concurrent reference to FIG. 4, the patient support 32 includes at least one of the patient turning devices 202 for moving the patient support surface 58, for example, during the movement therapy. The patient turning devices 202 are positioned between the carrier sheet 120 and the bottom cover 130. More particularly, the patient turning devices 202 are coupled to an underside of the carrier sheet 120 and may not be coupled to the bottom cover 130. The patient turning devices 202 include at least one inlet port 204, 206 configured to be arranged in fluid communication with the second conduit assembly 124, the ports 212 of the connector assembly 142, and the fluid source. The carrier sheet 120 includes at least one aperture 154 sized and positioned such that, when the patient turning devices 202 are coupled to the carrier sheet 120, the inlet ports 204, 206 extend through the apertures 154. In manners to be described, at least one of the patient turning devices 202 is configured to be selectively inflated and deflated in order to move at least a portion of the patient support surface 58 away from or towards the patient support deck 38, respectively.

Figure 7:
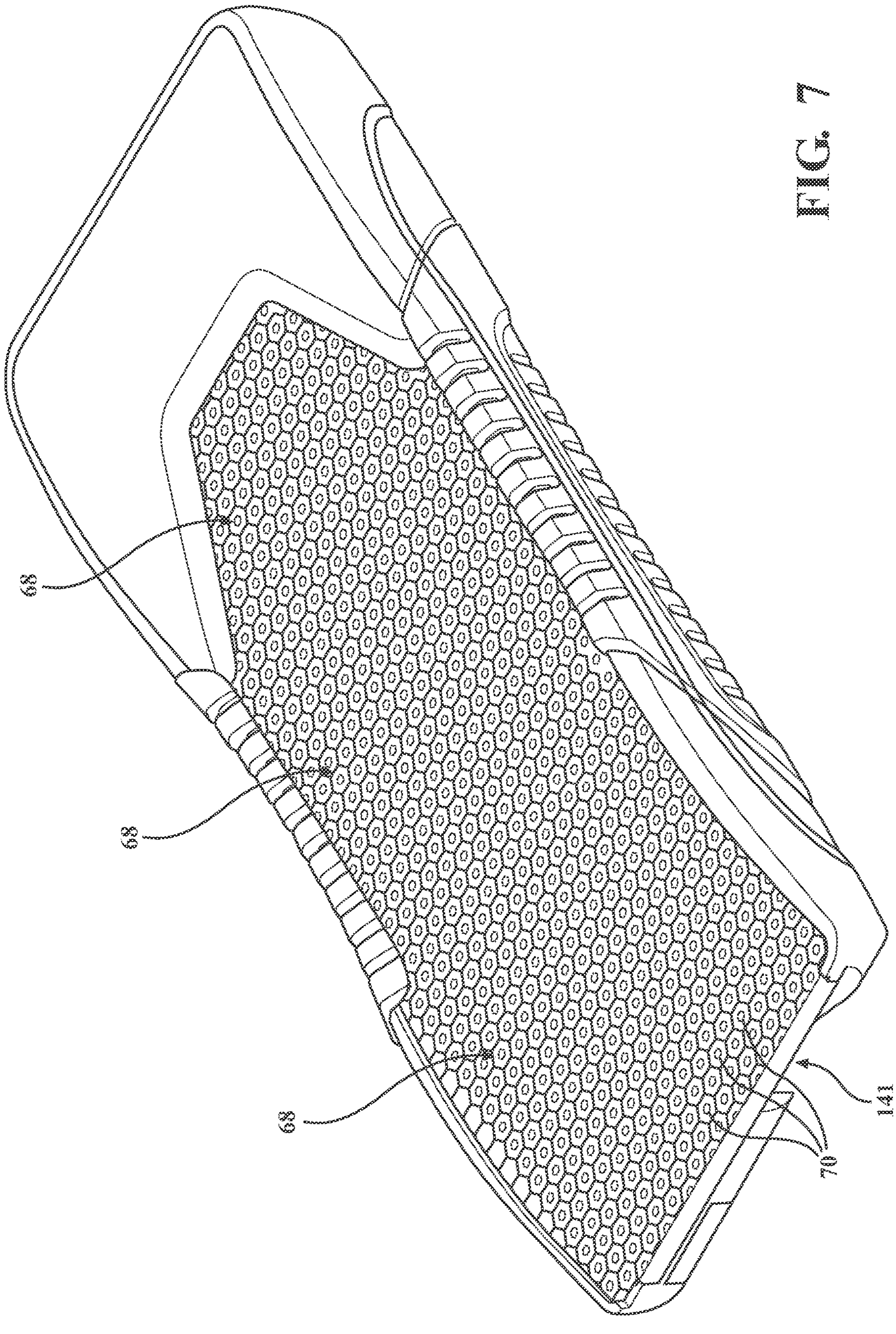
FIG. 7 is a perspective view of the crib assembly illustrating lattices of cells for supporting a patient.

Referring to FIG. 7, the crib assembly 50 is shown, including each lattice 68 of cells 70. In other versions, the crib assembly 50 may comprise one integrally formed lattice of cells, instead of separately formed lattices 68 that are connected together. In the embodiment shown, as described above, three separate lattices 68 are provided (see FIG. 5) including a head lattice, a torso lattice, and a foot lattice. One objective of the lattices 68 in the patient support design is to minimize the occurrence of pressure sores/ulcers by providing uniform pressure support for a range of patient weights.

Referring back to the connector assembly 142, the connector assembly 142 is generally shown in FIGS. 8-18. In certain embodiments, the connector assembly 142 is secured to the three dimensional interior corner 141 defined in the foot end frame member 94. The connector assembly 142 is configured to be in fluid communication with the aforementioned fluid source, and further configured to be in fluid communication with the first conduit assembly 110 and the second conduit assembly 124.

The recess 140 of the cover assembly 52 may be substantially aligned with the three dimensional interior corner 141 (i.e., a complementary recess) defined within the foot end frame member 94, as shown in FIG. 5. The connector assembly 142 is positioned within the recess 140 and secured to the three dimensional interior corner 141 so that the plurality of ports 212 are accessible by caregivers positioned near the foot end 35 from an underside of the patient support 32.

Figure 8:
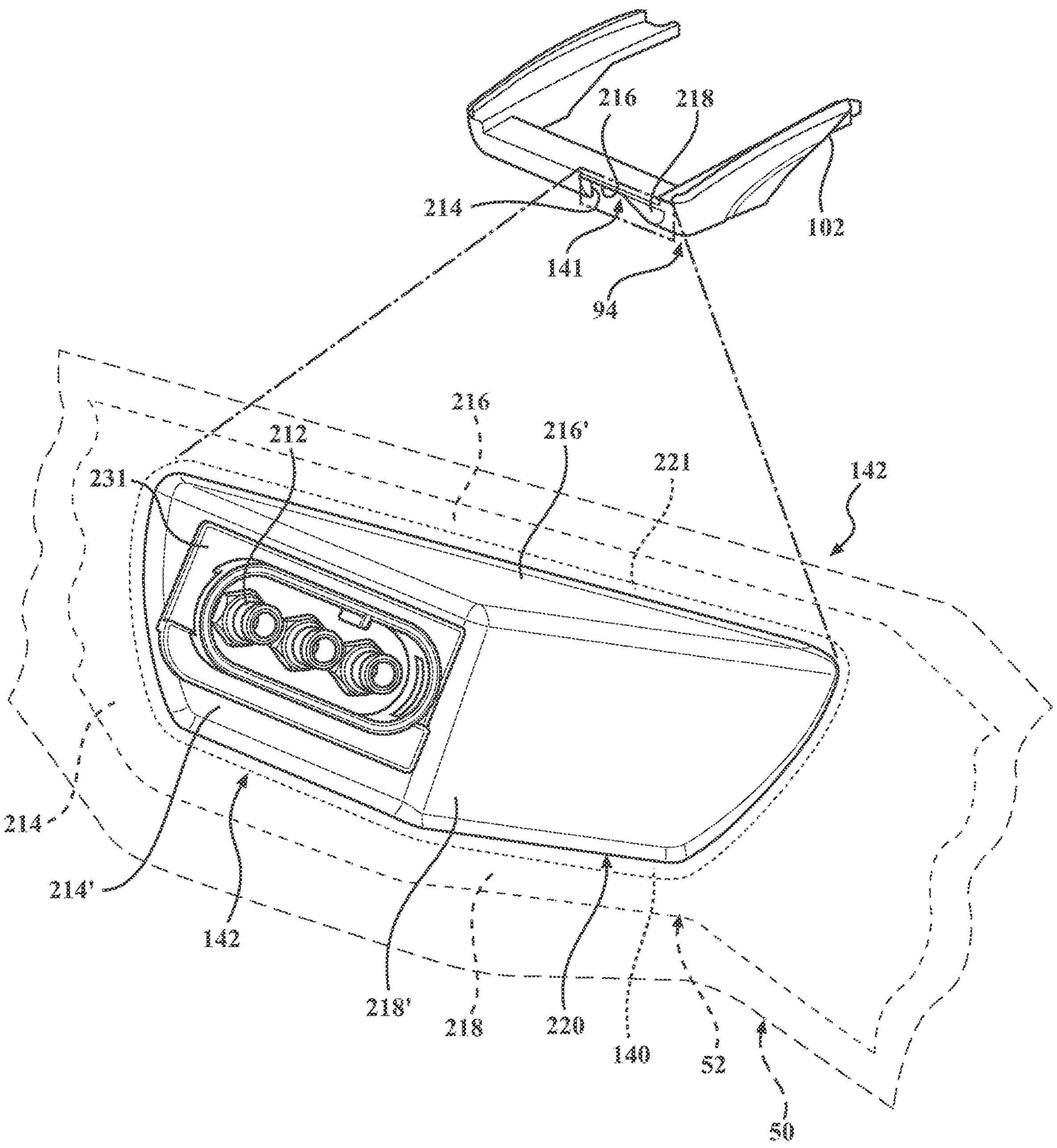
FIG. 8 is a perspective view of a connector assembly located in a three dimensional interior corner of the crib assembly, with an enlarged perspective view of the three dimensional interior corner showing the connector assembly including a carrier with the carrier having bent lips (shown in phantom) with the lips coupled to the cover assembly (shown in phantom) with the cover assembly coupled to the crib assembly (shown in phantom).
Figure 9:
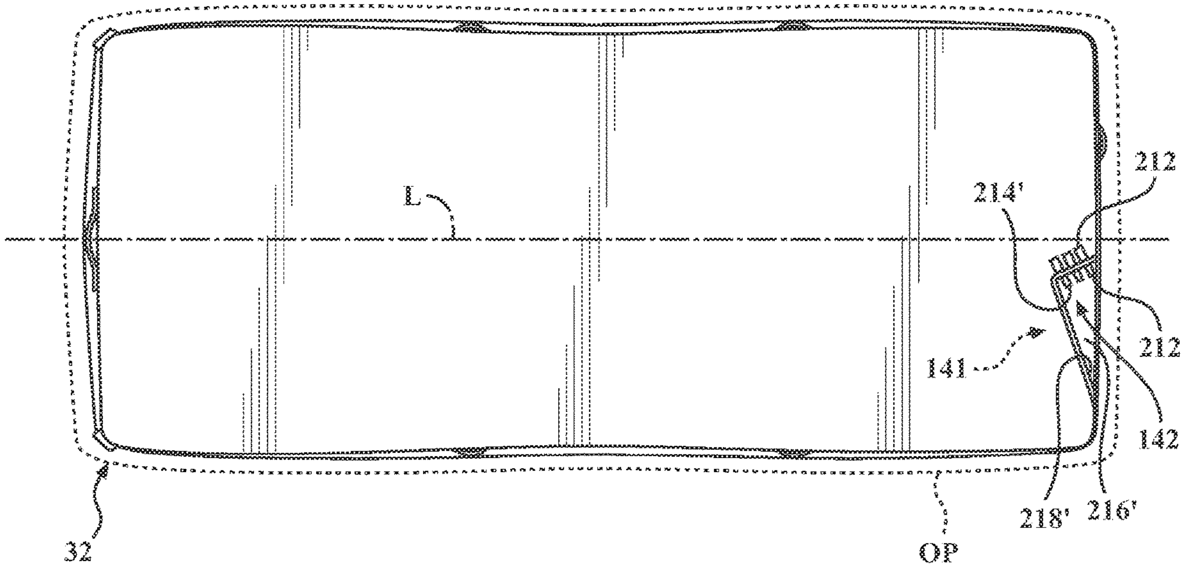
FIG. 9 is a bottom view of the patient support illustrating the connector assembly inside the outer periphery of the patient support surface.

Referring to FIGS. 8 and 9, positioning the connector assembly 142 at the three dimensional interior corner 141 and inside the outer periphery (OP) of the patient support surface 58 effectively shields its ports 212 from being an obstruction to the caregiver, the patient, and/or the patient support apparatus 30. Similarly, with the connector assembly 142 arranged in this manner, exterior tubing TUBES coupled to the plurality of ports 212 may also be routed out of the way of the caregiver, patient, and/or patient support apparatus 30. For example, as best shown in FIGS. 9 and 10, by positioning the connector assembly 142 in the three dimensional interior corner 141, the ports 212 present no obstacle to the caregivers or patients, as compared to ports that project beyond the outer periphery (OP), such as at the sides of the patient support 32, where caregivers and patients could inadvertently contact the ports by merely walking around the patient support apparatus 30.

Figure 10:
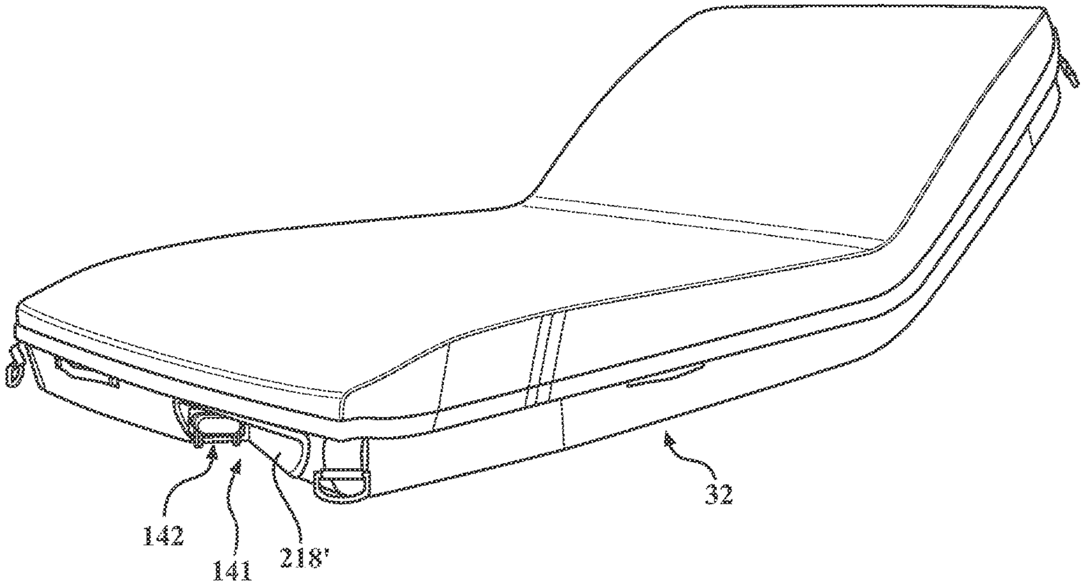
FIG. 10 is a perspective view of the patient support illustrating the connector assembly in a recess of the cover assembly.
Figure 11:
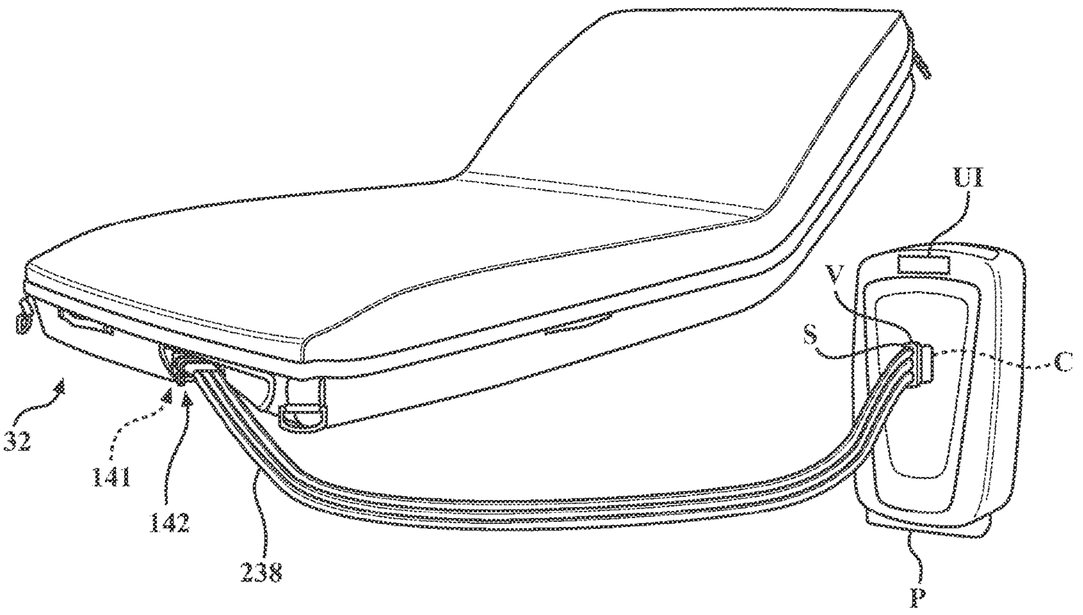
FIG. 11 is a perspective view of the patient support illustrating the connector assembly in the recess of the cover assembly with the connector assembly attached to a fluid source with external tubing.

In the embodiment shown in FIGS. 9-11, the connector assembly 142 is presented at the underside of the patient support 32 and the associated exterior tubing TUBES coupled to the connector 210 are also located at the underside of the patient support 32 and able to be routed easily over or around a footboard on which the fluid source (e.g., a pump) may be hung. However, positioning the connector assembly 142 at the three dimensional interior corner 141 still allows the caregiver to easily access the connector 210 to connect/disconnect the exterior tubing TUBES.

Figure 3:
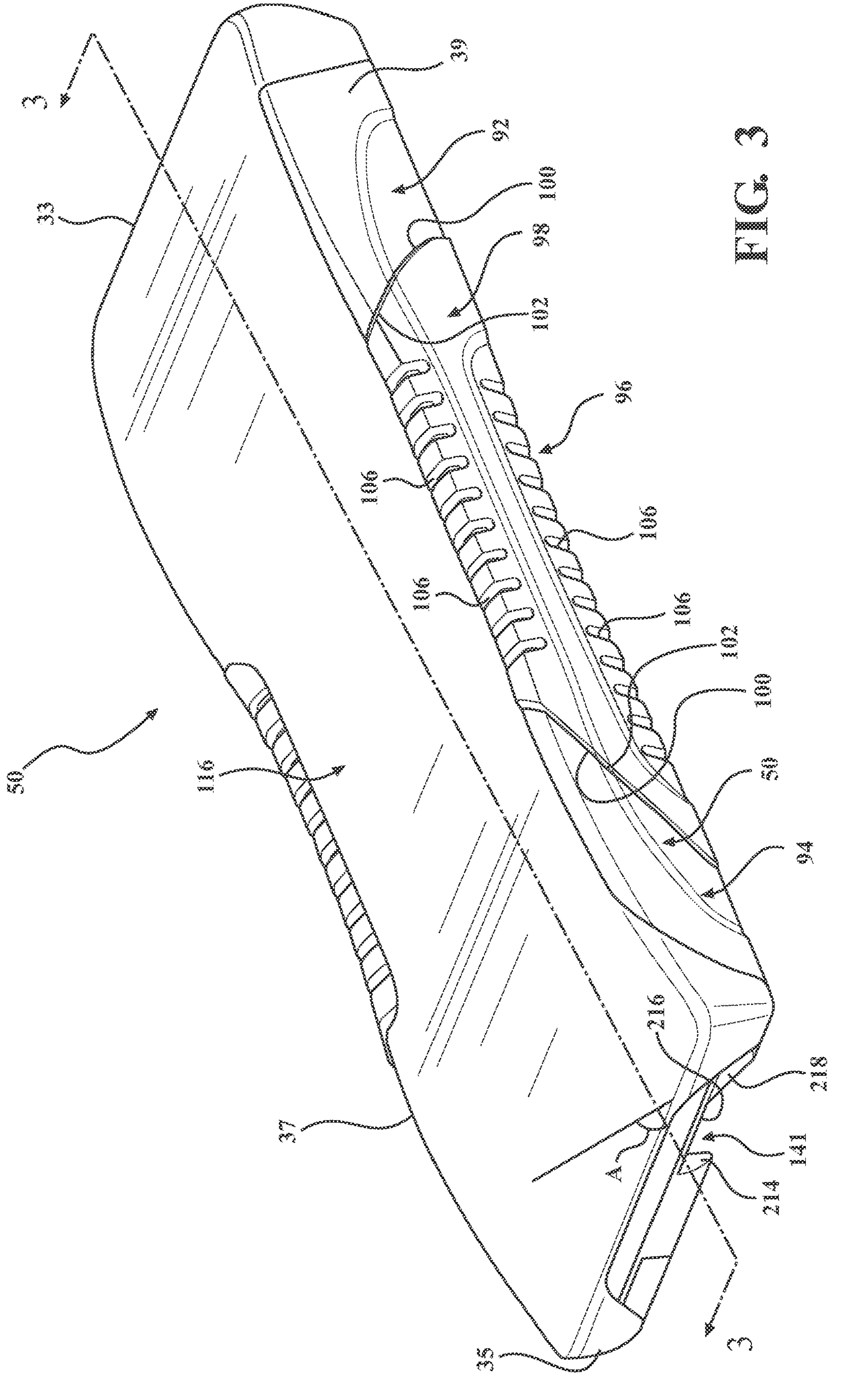
FIG. 3 is a perspective view of the crib assembly and the spacer layer.

Referring specifically to FIGS. 3 and 8, the three dimensional interior corner 141 of the crib assembly 50 includes three walls. Although the geometric configuration of each wall is not particularly limited, each wall has an exterior surface facing away from the crib assembly 50. In one embodiment, the connector assembly 142 is secured to the first wall 214 with the first wall 214 oriented along the length of the crib assembly 50. In this embodiment, the exterior surface area of the first wall 214 is less than the exterior surface area of each remaining wall. Typically, the second wall 216 extends along a plane that is parallel with a plane generally corresponding to the top portion of the crib assembly 50 (e.g., a horizontal plane) and the third wall 218 extends along and transverse to the width of the crib assembly 50 (e.g., in a vertical plane). Phantom lines in FIG. 3 help illustrate the orientation of the first wall 214 and the third wall 218 and show how the third wall 218 is oriented at an acute angle A to a longitudinal axis L of the patient support 32. It also shows that the first wall 214 is slightly askew with respect to the longitudinal axis L, but could be parallel to the longitudinal axis L in some embodiments.

The connector assembly 142 may be secured to the three dimensional interior corner 141 of the crib assembly 50 by any suitable method. For example, the connector assembly 142 may be secured to the three dimensional interior corner 141 by fastening the connector assembly 142 to the crib assembly 50. The connector assembly 142 may be glued, snapped, clipped, welded, velcroed, etc. to the crib assembly 50. The alignment of the connector assembly 142 within the three dimensional interior corner 141 is not particularly limited. Although in certain embodiments, such as shown in FIGS. 8 and 9, the plurality of ports 212 of the connector assembly 142 extend transverse to the length of the crib assembly 50 and typically extend transverse to the width of the crib assembly 50. In other words, in certain embodiments, such as shown in FIGS. 8-10, the plurality of ports 212 extend askew to the longitudinal axis L (see FIG. 9) and askew to a lateral axis, perpendicular to the longitudinal axis L. This orientation of the plurality of ports 212 eliminates the need for abrupt turns in the external tubing TUBES, which is cumbersome when the tubing is relatively thick and not easily bendable (commonly used when accommodating pressurized flow). Thus, the orientation of the plurality of ports 212 allows the external tubes TUBES to be routed easily over or around a footboard on which the fluid source (e.g., a pump) may be hung, as compared to ports that project perpendicular to a lateral axis or longitudinal axis.

As best shown in FIGS. 8 and 16-18, the connector assembly 142 may also include a carrier 220 having three walls 214', 216', and 218' generally shaped as a three dimensional corner corresponding to the shape with the three dimensional interior corner 141 of the crib assembly 50, i.e., congruent therewith. In other words, the carrier 220 is shaped such that the carrier 220 may be inserted in and secured to the three dimensional interior corner 141 of the crib assembly 50, as shown in FIGS. 8-10, so that the plurality of ports 212 are accessible by caregivers positioned near the foot end 35 from an underside of the patient support 32. For example, the three walls 214', 216', and 218' of the carrier 220 may be shaped to abut and be oriented the same as the three walls 214, 216, and 218 of the three dimensional interior corner 141 of the crib assembly 50 described above, with the first wall 214' of the carrier 220 defining a passage with the connector 210 disposed therein. However, as described above, the connector assembly 142 may be positioned in the three dimensional interior corner 141 without the carrier 220.

When the connector assembly 142 is positioned in the three dimensional interior corner 141, an exterior end 222 (see FIG. 14) of the plurality of ports 212 is presented on the exterior of the crib assembly 50 and an interior end 224, opposite the exterior end 222, is presented on the interior of the crib assembly 50. The exterior end 222 of the plurality of ports 212 is configured to couple to the exterior tubing TUBES from the fluid source. In contrast, the interior end 224 the plurality of ports 212 are configured to couple to tubing residing within the crib assembly 50. For example, the interior end 224 is configured to couple to tubing associated with patient turning devices 202 and to the low air loss system. In one embodiment, the plurality of ports 212 is further defined as three ports with two of the three ports configured to provide fluid to patient turning devices 202 and the remaining port configured to provide air to the low air loss system.

The outer diameter of a portion of the plurality of ports 212 adjacent the interior end 224 may be tapered to facilitate coupling the plurality of ports 212 to tubing residing within the crib assembly 50. The outer diameter of the plurality of ports 212 adjacent the exterior end 222 may include a circumferential groove configured for locating and securing an O-ring.

The carrier 220 may be secured to the crib assembly 50 by any suitable method, such as those mentioned above with respect to connecting the connector assembly 142 to the crib assembly 50. In one embodiment, each wall of the carrier 220 also has a bent lip 221 with each bent lip 221 coupled to the cover assembly 52 about the recess 140. For example, as best shown in the enlarged portion of FIG. 8, the carrier 220 includes the bent lip 221 (shown in phantom) about each wall with each bent lip 221 coupled to the cover assembly 52 (shown in phantom), which is coupled to the crib assembly 50 (shown in phantom). Each bent lip 221 may be bonded, glued, or mechanically coupled to the cover assembly 52. Typically the bent lip 221 is coupled to the cover assembly 52 by a radio frequency (RF) welding technique. Thus, the connector assembly 142 fits in the recess 140 and is secured about its periphery via the bent lips 221 to the cover assembly 52, while the walls 214', 216', 218' of the carrier 220 are fastened to the walls 214, 216, 218 that form the three dimensional interior corner 141.

Referring now to the connector 210 of the connector assembly 142, as best shown in FIGS. 12 and 13, the connector 210 may include a body 226 having a first side 228 (FIG. 12) facing outward from the patient support 32 and a second side 230 (FIG. 13) opposite the first side 228 and facing inward into the patient support 32, with the first side 228 and second side 230 spaced by a width. The plurality of ports 212 also extend from the body 226. Typically, the plurality of ports 212 extend from both the first and second sides 228, 230 of the body 226 with the exterior end 222 extending from the first side 228 and the interior end 224 extending from the second side 230. The connector 210 may be formed from any suitable material, such as a thermoplastic polymer or a blend of thermoplastic polymers. In one embodiment, the connector 210 is formed from a polycarbonate/acrylonitrile butadiene styrene (PC/ABS). When the connector 210 is formed from PC/ABS the connector has excellent moldability, is impact resistant, and also resists (e.g. does not swell when exposed to) solvents/chemicals commonly found in medical grade cleaning solutions.

Figure 16:
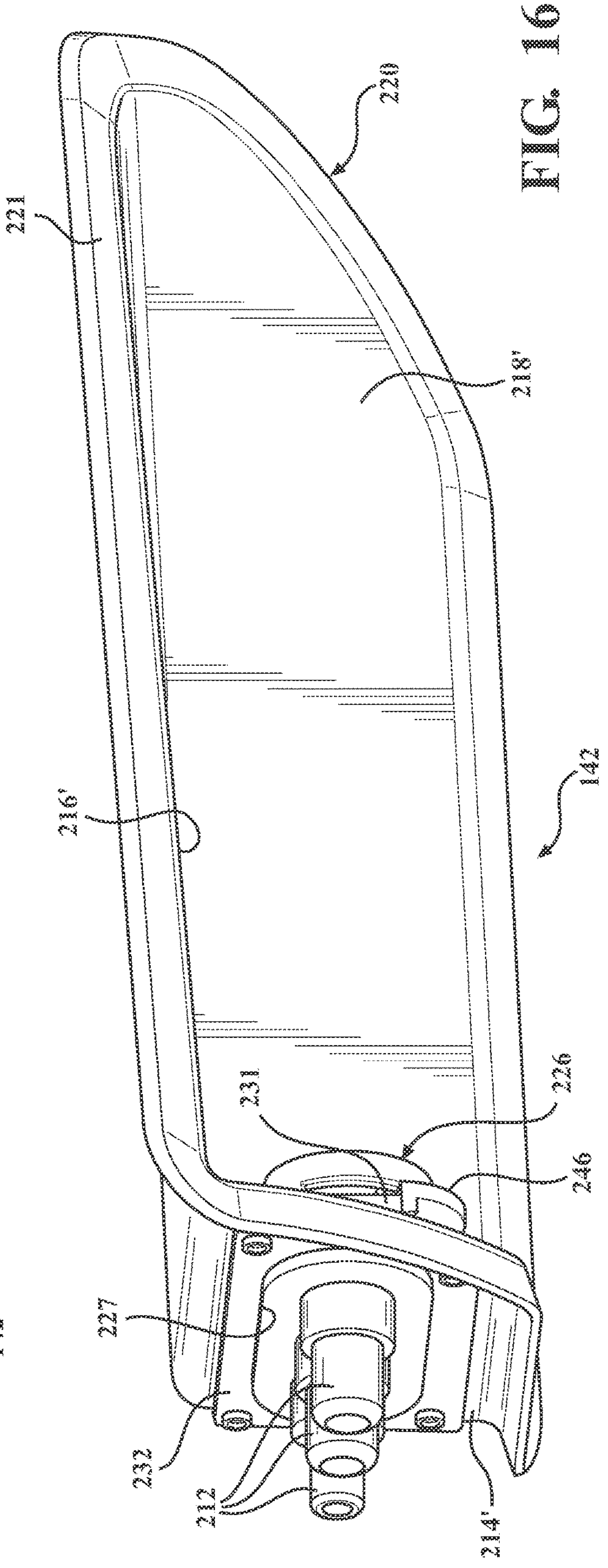
FIG. 16 is a perspective view of the connector assembly including the carrier and a back plate.

Referring to FIGS. 14 and 16, the carrier 220 has a wall opening (not shown) defined in the wall 214' to receive a portion of the body 226 therethrough to facilitate connection of the connector 210 to the carrier 220. The body 226 of the connector 210 may comprise a front plate 231 to abut one side of the wall 214' and the connector assembly 142 may include a back plate 232 to abut an opposing side of the wall 214'. The front plate 231 may connect to the back plate 232 with the wall 214' captured therebetween. The back plate 232 defines a plate opening 227 of similar size and shape with the wall opening in the carrier 220. The portion of the body 226 disposed within the wall opening is also disposed within the plate opening 227 and projects beyond the back plate 232, as shown in FIG. 16. The portion of the body 226 that projects beyond the back plate 232 is connected to the front plate 231 (e.g., integrally formed therewith). The back plate 232 is relatively larger than the wall opening in the carrier 220 and couples to the front plate 231 of the body 226 for securing the connector 210 to the carrier 220.

The front plate 231 and back plate 232 may be coupled by any suitable method. For example, a plurality of projections/posts may extend between the front plate 231 and the back plate 232 and through the carrier 220 to couple the front plate 231 and the back plate 232. Alternatively, an adhesive applied to both the front plate 231 and the back plate 232 may couple the front plate 231 and the back plate 232 with the carrier 220 disposed therebetween. Alternatively, screws, magnets, velcro, rivets, etc. may couple the front plate 231 and the back plate 232 to secure the connector 210 to the carrier 220.

Figure 18:
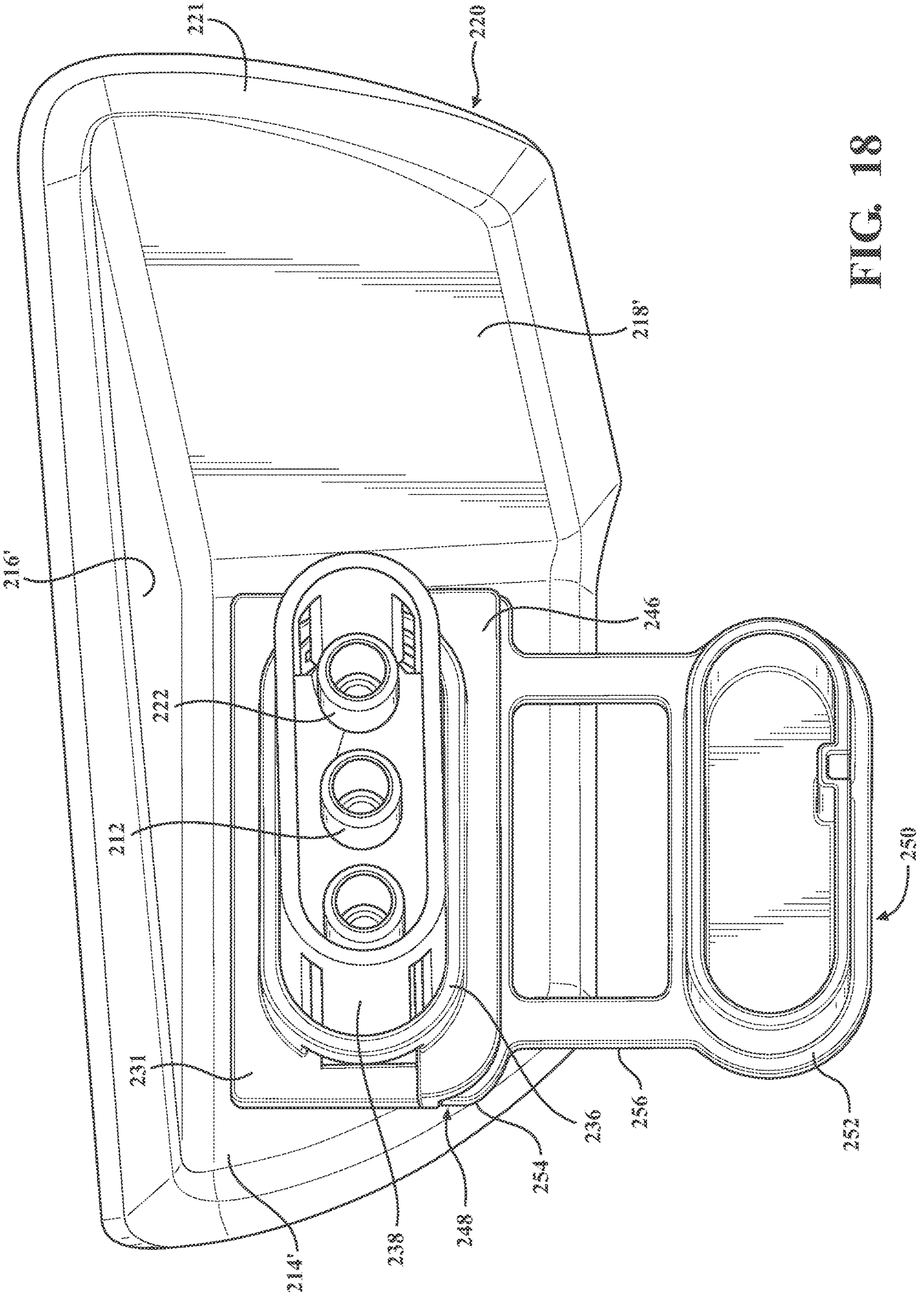
FIG. 18 is a perspective view of the connector assembly including the carrier, the flexible cover, and the fluid source fitting.

As best shown in FIGS. 12 and 14, the connector assembly 142 may further include a connection element 236 extending from the first side 228 and at least partially surrounding the plurality of ports 212 for securing the plurality of ports 212 to a fluid source fitting 238 (FIG. 18). The geometry of the connection element 236 is not particularly limited and may be selected to match the geometry of the fluid source fitting 238, or vice versa. In other words, the purpose of the connection element 236 is to align the plurality of ports 212 with the fluid source fitting 238.

The connection element 236 may comprise any type of mechanism to secure the plurality of ports 212 to the fluid source fitting 238. For example, as shown in FIG. 14, the connection element 236 may comprise a peripheral wall defining a plurality of voids 240 for accepting snap fit projections of the fluid source fitting 238. Alternatively, the connection element 236 may be secured to the fluid source fitting 238 by a press fit connection, magnets, snaps, adhesive, velcro, etc.

The connection element 236 may also include an alignment projection 242 extending inwardly from the peripheral wall of the connection element 236. For example, as shown best in FIG. 12, the alignment projection 242 may be to the right of the center of the connection element 236. The alignment projection 242 is received in a complementary groove (not shown) of the fluid source fitting 238. The alignment projection 242 being a single projection and/or being in an off-center location ensures that the fluid source fitting 238 is correctly aligned. For example, when the connector assembly 142 includes a first, second, and third port, the alignment projection 242 ensures that the first port of the connector assembly 142 is connected to the corresponding fluid source (not shown) carried by the fluid source fitting 238. In other words, the configuration of the alignment projection 242 prevents the fluid source fitting 238 from being installed upside-down.

Figure 17:
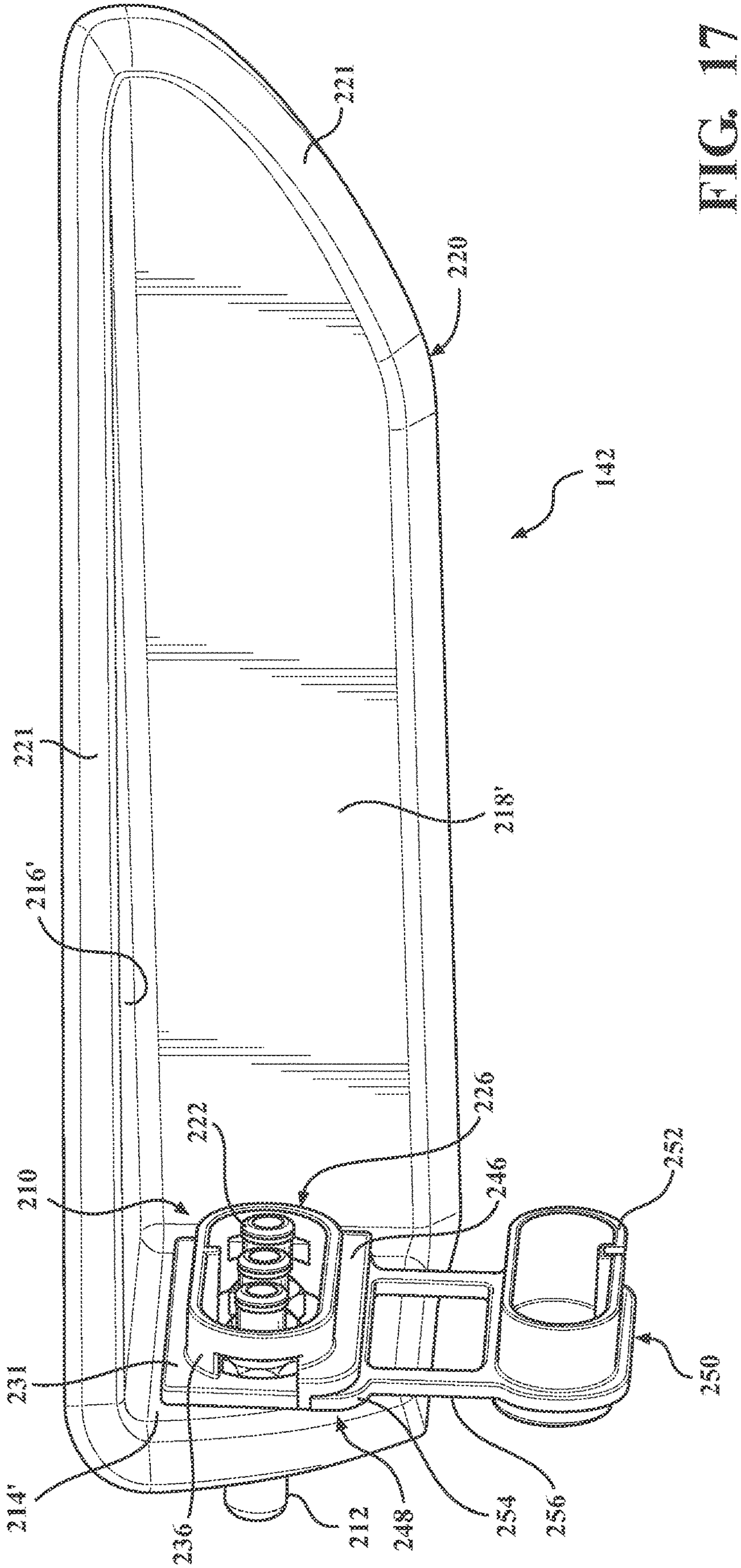
FIG. 17 is a perspective view of the connector assembly including the carrier and a flexible cover.

With reference to FIGS. 17 and 18, the front plate 231 of the body 226 may further include a raised ridge 246. When the carrier 220 is sandwiched between the front plate 231 and the back plate 232, the raised ridge 246 and the carrier 220 cooperate to define a channel 248 for receiving and securing a flexible cover 250.

The flexible cover 250 may be used to enclose the exterior ends 222 of the plurality of ports 212 when the plurality of ports 212 are not connected to the fluid source (flexible cover 250 shown in open position in FIGS. 17 and 18). Although the geometry of the flexible cover 250 is not particularly limited, the flexible cover 250 typically includes a sealing portion 252 that is complementarily shaped with the connection element 236, such that the sealing portion 252 is fittingly insertable in the connection element 236 to mate in a friction fit manner with the connection element 236. The flexible cover 250 also typically includes an anchor 254 that is secured in the channel 248 defined by the cooperation of the raised ridge 246 and the carrier 220. The anchor 254 may be secured in the channel 248 by any suitable method, such as, mechanical interlocking, snaps, adhesive, magnets, velcro, etc. In one embodiment, at least one of the posts that extend through the carrier 220 between the front plate 231 and the back plate 232 also extend through the anchor 254. The flexible cover 250 may also include a plurality of straps 256 that are integral with the anchor 254 and the sealing portion 252 to allow the sealing portion 252 to be movable relative to the anchor 254, which is stationary in the channel 248. Although not required, the cover 250 is typically formed from an elastic polymer, such as rubber.

The connector 210 may be employed in any suitable patient support 32 and may have different configurations for different patient supports 32 depending on use. For example, if the patient support 32 employs the low air loss system and a turn assist system, then all three of the ports 212 may be available for routing fluid from the fluid source (e.g., the pump P shown in FIG. 11) to the first conduit assembly 110 and the second conduit assembly 124. In other words, the connector 210 may be provided with all of the ports 212 being open to fluid communication between the fluid source and the first conduit assembly 110 and between the fluid source and the second conduit assembly 124. However, in some embodiments, the patient support 32 may only comprise a single system, e.g., only the low air loss system or only the turn assist system. In this case, all three ports 212 will not be needed. As a result, the connector 210 may be provided with one or two of the three ports blocked from fluid communication. This could be accomplished by forming a wall in the ports to be blocked, placing a barrier in the ports to be blocked, or the like. As a result, the same fluid source fitting 238 and the same fluid source may be used for both configurations of patient support 32, without requiring different port configurations. In other words, instead of using a connector with three ports, a connector with two ports, and a connector with one port, a single connector 210 can be used for various different configurations of patient supports 32.

Referring to FIG. 11, the pump P may be coupled to a controller C, which is coupled to one or more sensors S, such as pressure sensors associated with each of the ports 212. The pressure sensors may be in fluid communication with the ports 212 once the pump is connected via the external tubing TUBES. Upon start-up, the controller C is configured to activate the pump P to pump fluid to the ports 212, such as through a valve manifold V with solenoid valves configured to selectively route fluid to the ports 212 or to atmosphere. If any of the sensors S detect a pressure signature (e.g., a quick rise in pressure) consistent with the ports 212 being blocked, then the controller C is able to identify which of the ports 212 is blocked and which are open and available for fluid communication. The controller C is then able to determine which configuration of patient support 32 is connected, i.e., one with both low air loss and turn assist systems, one with only a turn assist system, or one with only a low air loss system (of course, other configurations are possible). This information may be stored in a look-up table in memory that associates patient support configurations with the feedback from the pressure sensors and the determination of open/blocked ports. The controller C can access the look-up table to determine which configuration is being used and can also modify a user interface UI accordingly, by loading different software based on the different configurations of the patient support 32. For example, if only the low air loss system is employed, input and display features associated with turn assist would not be shown and vice versa. Similarly, if both low air loss and turn assist systems are employed and in use, the user interface UI may have user inputs associated with both (e.g., to turn each on/off, set fluid flow rates for each, set durations of use for each, etc.) and may have different output displayed based on configuration as well.

It is to be appreciated that the terms “include,” “includes,” and “including” have the same meaning as the terms “comprise,” “comprises,” and “comprising.”

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus for supporting a patient, the patient support apparatus comprising:

a base;

an intermediate frame with a patient support deck; and a patient support disposed on the patient support deck, the patient support including:

a crib assembly having a top surface and an opposing bottom surface, the crib assembly defining a three-dimensional interior corner;

a cover assembly enclosing the top surface and the opposing bottom surface of the crib assembly and comprising a patient support surface having an outer periphery, the cover assembly defining a recess adjacent to the three-dimensional interior corner of the crib assembly; and a connector assembly for connecting the patient support to a fluid source, the connector assembly comprising a connector with a port, and a carrier having three walls generally shaped as a three-dimensional corner, with a first wall of the three walls defining a window with the connector disposed therein, the connector assembly being disposed in the recess of the cover assembly to present the port of the connector for connection to the fluid source at the three-dimensional interior corner and inside the outer periphery of the patient support surface.

2. The patient support apparatus of claim 1, wherein the port of the connector assembly of the patient support extends askew to a longitudinal axis L extending from a foot end to a head end of the crib assembly.

3. The patient support as set forth in claim 2, wherein the port of the connector assembly of the patient support extends askew to the longitudinal axis L extending from the foot end to the head end of the crib assembly and extend askew to a lateral axis extending perpendicular to the longitudinal axis L; and wherein the recess of the cover assembly is defined in the foot end.

4. The patient support apparatus of claim 1, wherein each wall of the carrier has an exterior surface facing away from an interior of the patient support, and wherein a surface area of the exterior surface of the first wall is less than a surface area of the exterior surface of each remaining wall.

5. The patient support apparatus of claim 4, wherein the three walls of the carrier each have a bent lip coupled to the cover assembly; and wherein the bent lips of the three walls of the carrier are welded to the cover assembly by radio frequency (RF) welding.

6. The patient support apparatus of claim 1, wherein the port of the connector assembly is accessible from an underside of the patient support.

7. The patient support apparatus of claim 1, wherein the connector of the connector assembly further comprises:

a body having a first side facing away outward from the patient support surface and a second side opposite the first side and facing inward towards the patient support surface, the first side and second side spaced by a width, the body comprising the port extending from an interior end to an exterior end; and a back plate defining a plate opening with the width of the body disposed within the plate opening, the back plate coupled to the body for securing the connector to the carrier.

8. The patient support apparatus of claim 7, wherein an outer diameter of a portion of the port adjacent the interior end is tapered to facilitate the coupling of the port to tubing residing within the crib assembly.

9. The patient support apparatus of claim 7, wherein the connector assembly further comprises:

a connection element extending from the first side at least partially surrounding the port for securing the port to a fluid source fitting; and a front plate integral with the body and extending substantially parallel with and past the first side.

10. The patient support apparatus of claim 9, wherein the carrier is sandwiched between the back plate and the front plate.

11. The patient support apparatus of claim 10, wherein a plurality of posts extend through the carrier to couple the back plate and the front plate.

12. The patient support apparatus of claim 9, wherein the connection element comprises an alignment projection configured to ensure the fluid source fitting is correctly aligned with the connection element.

13. The patient support apparatus of claim 12, wherein the body further includes a raised ridge, and wherein the raised ridge and the carrier collectively define a channel, and wherein the connector assembly further comprises a flexible cover having an anchor secured in the channel.

14. The patient support apparatus of claim 13, wherein the flexible cover further includes a sealing portion configured to be inserted into a void defined by the connection element of the body for sealing the connector.

15. The patient support apparatus of claim 13, wherein the port of the connector of the connector assembly is configured to couple a low air loss assembly to the fluid source.

16. The patient support apparatus of claim 15, wherein the connector of the connector assembly further includes two ports configured to couple a patient turning system to the fluid source.

17. The patient support apparatus of claim 1, wherein the three-dimensional interior corner is configured to receive a fluid source fitting carrying tubing on an underside of the patient support surface.

18. The patient support apparatus of claim 17, wherein the three-dimensional interior corner is configured to retain the tubing on an underside of the patient support surface while the patient support surface is in motion.

19. The patient support apparatus of claim 1, wherein the first wall of the carrier of the connector assembly is rigid.

20. The patient support apparatus of claim 1, wherein the crib assembly includes an upper conformable layer having a lattice of cells, and a lower conformable layer.

* * * * *